(12) United States Patent
Yokoyama

(10) Patent No.: US 11,322,775 B2
(45) Date of Patent: May 3, 2022

(54) SECONDARY BATTERY, METHOD FOR PRODUCING SECONDARY BATTERY, AND ELECTRONIC APPARATUS

(71) Applicant: SEIKO EPSON CORPORATION, Tokyo (JP)

(72) Inventor: Tomofumi Yokoyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 379 days.

(21) Appl. No.: 16/659,881

(22) Filed: Oct. 22, 2019

(65) Prior Publication Data

US 2020/0127326 A1   Apr. 23, 2020

(30) Foreign Application Priority Data

Oct. 23, 2018   (JP) .............................. JP2018-198983

(51) Int. Cl.
*H01M 10/0562*   (2010.01)
*H01M 10/0525*   (2010.01)

(52) U.S. Cl.
CPC ... *H01M 10/0562* (2013.01); *H01M 10/0525* (2013.01); *H01M 2300/0071* (2013.01)

(58) Field of Classification Search
CPC ......... H01M 10/0525; H01M 10/0562; H01M 2300/0071
See application file for complete search history.

(56) References Cited

FOREIGN PATENT DOCUMENTS

JP   2018-037326 A   3/2018

*Primary Examiner* — Osei K Amponsah
(74) *Attorney, Agent, or Firm* — Oliff PLC

(57) ABSTRACT

A secondary battery according to the present disclosure includes a solid electrolyte portion containing a lithium composite metal oxide represented by the following compositional formula (1), and current collectors disposed opposite to each other through the solid electrolyte portion:

$$Li_{7-x}La_3Zr_{2-(x+y)}Ma_xMb_yO_{12} \quad (1)$$

provided that $0.5 < x+y < 1.2$ and $(ix+jy)+4(x+y) > 8$ wherein i is an oxidation number of Ma and j is an oxidation number of Mb are satisfied, and Ma represents one or more types of Sb, Bi, Ce, Mn, V, Te, Tc, and Sn, and Mb represents one or more types of Nb, Cr, Mo, W, Ta, and Ti.

11 Claims, 10 Drawing Sheets

| | CONFIGURATION OF LITHIUM BATTERY | | | EVALUATION RESULTS | | |
|---|---|---|---|---|---|---|
| | THICKNESS [μm] | ELECTRODE AREA [cm$^2$] | VOLUME [cm$^3$] | INTERFACE RESISTANCE [Ωcm$^2$] | DISCHARGE CAPACITY [μAh] | CAPACITY DENSITY [mAh/cm$^3$] |
| EXAMPLE 1 | 0.5 | 0.385 | $1.9 \times 10^{-5}$ | 0.8 | 3.2 | 166 |
| EXAMPLE 2 | 1.0 | 0.385 | $3.9 \times 10^{-5}$ | 0.8 | 6.1 | 158 |
| EXAMPLE 3 | 5.0 | 0.385 | $1.9 \times 10^{-4}$ | 0.8 | 12.0 | 62 |
| EXAMPLE 4 | 10.0 | 0.385 | $3.9 \times 10^{-4}$ | 0.8 | 16.0 | 41 |
| EXAMPLE 5 | 20.0 | 0.385 | $7.7 \times 10^{-4}$ | 0.8 | 20.0 | 26 |
| EXAMPLE 6 | 80.0 | 0.385 | $3.1 \times 10^{-3}$ | 0.8 | 482.0 | 156 |
| COMPARATIVE EXAMPLE 1 | 80.0 | 0.385 | $3.1 \times 10^{-3}$ | 200.0 | 412.0 | 134 |

FIG. 6

| | LITHIUM COMPOSITE METAL OXIDE OF COMPOSITIONAL FORMULA (1) | | | EVALUATION RESULTS | | |
|---|---|---|---|---|---|---|
| | ELEMENT Ma | ELEMENT Mb | COMPOSITIONAL FORMULA(1) | TOTAL ION CONDUCTIVITY [S/cm] | OPERATING VOLTAGE [V] | DISCHARGE CAPACITY [μAh] | CAPACITY DENSITY [mAh/cm$^3$] |
| EXAMPLE 7 | Sb | Ta | $Li_{6.6}La_3Zr_{1.3}Sb_{0.5}Ta_{0.2}O_{12}$ | $9.7 \times 10^{-4}$ | 1.8~2.8 | 3.2 | 166 |
| EXAMPLE 8 | V | Nb | $Li_{6.6}La_3Zr_{1.6}V_{0.4}Nb_{0.4}O_{12}$ | $4.3 \times 10^{-4}$ | 2.4~3.8 | 2.9 | 151 |
| EXAMPLE 9 | Ce | Mo | $Li_{6.6}La_3Zr_{1.4}Ce_{0.6}Mo_{0.6}O_{12}$ | $1.6 \times 10^{-4}$ | 2.8~4.5 | 1.1 | 57 |
| EXAMPLE 10 | Te | Cr | $Li_{6.6}La_3Zr_{1.4}Te_{0.2}Cr_{0.4}O_{12}$ | $9.3 \times 10^{-4}$ | 2.4~3.8 | 4.5 | 234 |

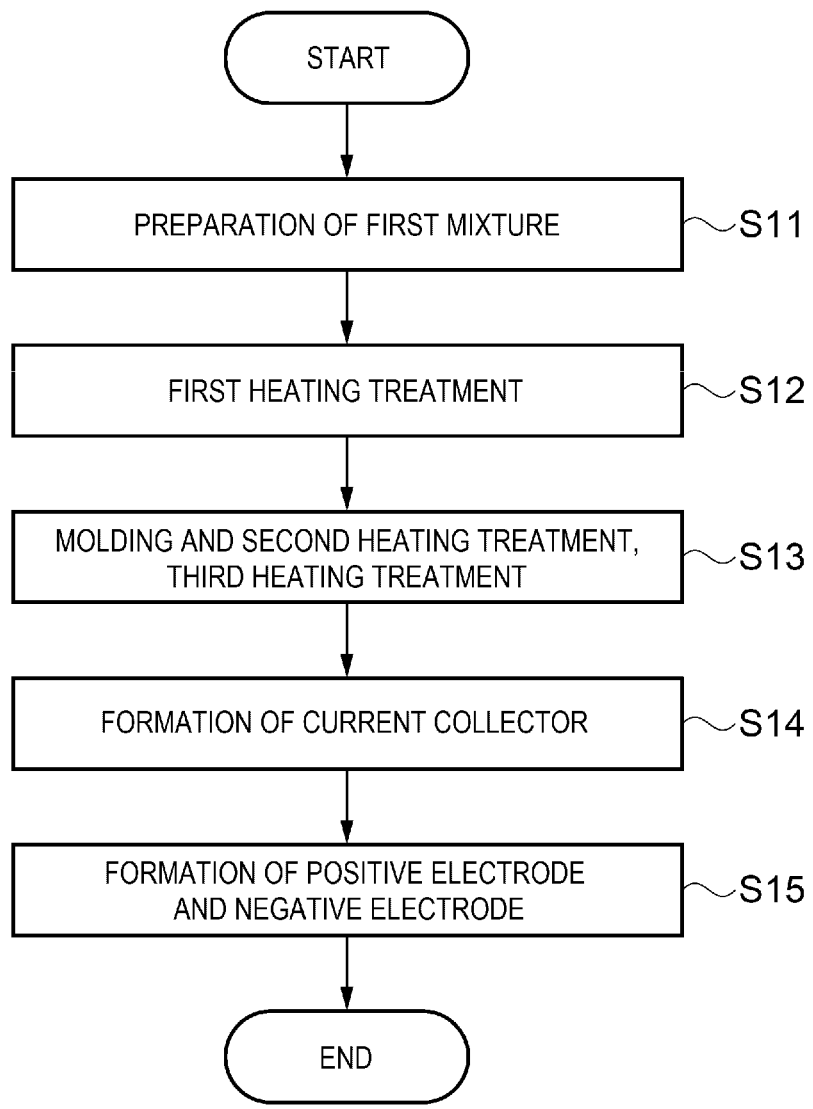

SECONDARY BATTERY, METHOD FOR PRODUCING SECONDARY BATTERY, AND ELECTRONIC APPARATUS

The present application is based on, and claims priority from JP Application Serial Number 2018-198983, filed Oct. 23, 2018, the disclosure of which is hereby incorporated by reference herein in its entirety.

BACKGROUND

1. Technical Field

The present disclosure relates to a secondary battery, a method for producing a secondary battery, and an electronic apparatus.

2. Related Art

Heretofore, there has been known a battery using a lithium composite metal oxide having a garnet-type crystal structure as an inorganic electrolyte. For example, JP-A-2018-37326 (Patent Document 1) proposes a battery using a solid electrolyte in which some lanthanum sites were substituted with neodymium and some lithium sites were substituted with gallium in lithium lanthanum zirconate of a lithium composite metal oxide having a garnet-type crystal structure.

However, the battery using the lithium composite metal oxide described in Patent Document 1 had a problem that the interface resistance increases and the battery reaction area is likely to decrease. More specifically, a solid electrolyte is formed in a pore of a positive electrode active material molded body to form a composite body. Therefore, a void in which the solid electrolyte is not formed is sometimes generated inside the positive electrode active material molded body. If such a void is generated, the interface resistance increases and the battery reaction area is likely to decrease.

SUMMARY

A secondary battery according to an aspect of the present application includes a solid electrolyte portion containing a lithium composite metal oxide represented by the following compositional formula (1), and current collectors disposed opposite to each other through the solid electrolyte portion:

  (1)

provided that $0.5<x+y<1.2$ and $(ix+jy)+4(x+y)>8$ wherein i is an oxidation number of Ma and j is an oxidation number of Mb are satisfied, and Ma represents one or more types of Sb, Bi, Ce, Mn, V, Te, Tc, and Sn, and Mb represents one or more types of Nb, Cr, Mo, W, Ta, and Ti.

In the above-mentioned secondary battery, Ma in the compositional formula (1) may be Sb, Mb in the compositional formula (1) may be Ta, and $0.5<x+y<1.2$ and $(ix+jy)+4(x+y)>8$ wherein i is an oxidation number of Sb and j is an oxidation number of Ta are satisfied.

In the above-mentioned secondary battery, the solid electrolyte portion may have a thickness of 0.5 μm or more and 30 μm or less.

An electronic apparatus according to an aspect of the present application includes the above-mentioned secondary battery.

A method for producing a secondary battery according to an aspect of the present application includes forming a solid electrolyte portion containing a lithium composite metal oxide represented by the following compositional formula (1), forming current collectors so as to sandwich the solid electrolyte portion, and causing a direct current to flow between the current collectors by applying a polarizing voltage therebetween:

  (1)

provided that $0.5<x+y<1.2$ and $(ix+jy)+4(x+y)>8$ wherein i is an oxidation number of Ma and j is an oxidation number of Mb are satisfied, and Ma represents one or more types of Sb, Bi, Ce, Mn, V, Te, Tc, and Sn, and Mb represents one or more types of Nb, Cr, Mo, W, Ta, and Ti.

In the above-mentioned method for producing a secondary battery, in the forming of a solid electrolyte portion, a solid electrolyte portion containing the lithium composite metal oxide in which in the compositional formula (1), the Ma is Sb, the Mb is Ta, and $0.5<x+y<1.2$ and $(ix+jy)+4(x+y)>8$ wherein i is an oxidation number of Sb, and j is an oxidation number of Ta are satisfied may be formed.

In the above-mentioned method for producing a secondary battery, the forming of a solid electrolyte portion may include preparing a first mixture by dissolving a plurality of types of raw materials containing elements constituting the lithium composite metal oxide represented by the compositional formula (1) in a first solvent, followed by mixing, forming a calcined body of the lithium composite metal oxide by subjecting the first mixture to a first heating treatment to cause a reaction, preparing a second mixture by grinding the calcined body, followed by mixing with a second solvent and a first binder, molding the prepared second mixture, followed by being subjected to a second heating treatment, preparing a third mixture by grinding a fired body that was subjected to the second heating treatment, followed by mixing with a third solvent and a second binder, and molding the third mixture, followed by being subjected to a third heating treatment.

In the above-mentioned method for producing a secondary battery, the forming of a solid electrolyte portion may include preparing a first mixture by dissolving a plurality of types of raw materials containing elements constituting the lithium composite metal oxide represented by the compositional formula (1) in a first solvent, followed by mixing, forming a calcined body of the lithium composite metal oxide by subjecting the first mixture to a first heating treatment to cause a reaction, forming a molded body by grinding the calcined body, followed by pressurization, and subjecting the molded body to a second heating treatment and a third heating treatment.

In the above-mentioned method for producing a secondary battery, in the causing of a direct current to flow, the polarizing voltage may be applied at 0.5 V or more and 6.0 V or less.

In the above-mentioned method for producing a secondary battery, in the forming of a solid electrolyte portion, the solid electrolyte portion having a thickness of 0.5 μm or more and 30 μm or less may be formed.

In the above-mentioned method for producing a secondary battery, in the forming of a solid electrolyte portion, as the first heating treatment, heating may be performed at 200° C. or higher and 540° C. or lower, as the second heating treatment, heating may be performed at 680° C. or higher and 1000° C. or lower, and as the third heating treatment, heating may be performed at 900° C. or higher and 1200° C. or lower.

BRIEF DESCRIPTION OF THE DRAWINGS

FIG. 6 is a table showing evaluation results of lithium batteries according to Examples of a second embodiment.

FIG. 7 is a process flow diagram showing a method for producing a lithium battery as a secondary battery according to a third embodiment.

DESCRIPTION OF EXEMPLARY EMBODIMENTS

Hereinafter, embodiments of the present disclosure will be described with reference to the drawings. The embodiments described below describe an example of the present disclosure. The present disclosure is not limited to the following embodiments, and various modifications embodied within a range that does not change the gist of the present disclosure are also included in the present disclosure. Note that in the following respective drawings, in order to make respective members have a recognizable size, the reduction scales of the respective members are made different from the actual ones.

First Embodiment

Secondary Battery

Figure 1:
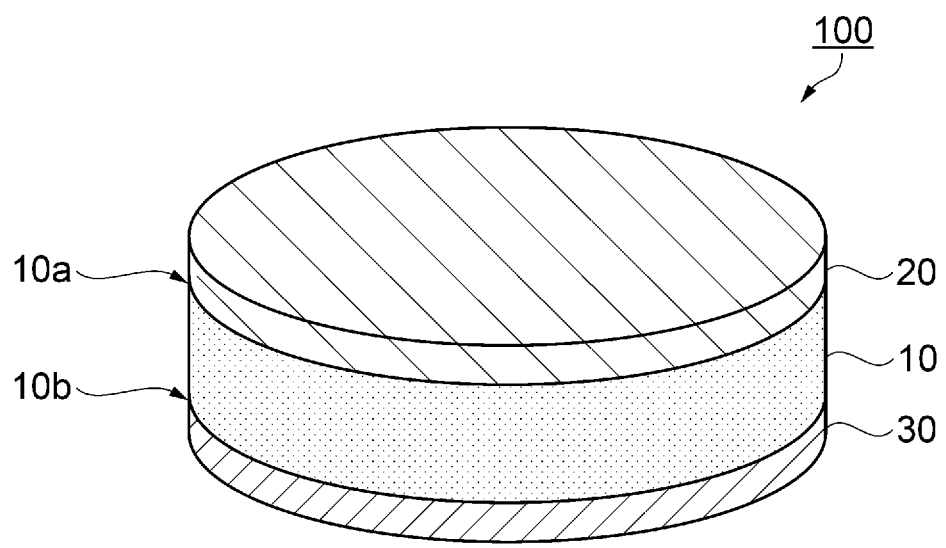
FIG. 1 is a schematic perspective view showing a configuration of a lithium battery as a secondary battery according to a first embodiment.

First, a secondary battery according to this embodiment will be described with reference to FIG. 1. In this embodiment, a lithium battery will be described as an example of the secondary battery. FIG. 1 is a schematic perspective view showing a configuration of a lithium battery as the secondary battery according to a first embodiment.

As shown in FIG. 1, a lithium battery 100 of this embodiment includes a solid electrolyte portion 10, and a pair of current collectors 20 and 30 disposed opposite to each other through the solid electrolyte portion 10. The lithium battery 100 is a stacked body in which the current collector 20, the solid electrolyte portion 10, and the current collector 30 are sequentially stacked. The current collector 20 and the solid electrolyte portion 10, and the solid electrolyte portion 10 and the current collector 30 are in contact with each other. In the solid electrolyte portion 10, a face in contact with the current collector 20 is defined as a face 10a, and a face in contact with the current collector 30 is defined as a face 10b. The current collector 20 and the current collector 30 may have the same shape or different shapes when viewed in plan view or in sectional view.

In the following description, in the lithium battery 100, a direction in which the current collectors 20 and 30 and the solid electrolyte portion 10 are stacked is defined as a normal direction of the lithium battery 100. Further, a distance of the current collector 20 or 30, the solid electrolyte portion 10, or the like in the normal direction of the lithium battery 100 is sometimes referred to as "thickness" thereof.

Here, although the details will be described later, in the lithium battery 100, by applying a polarizing voltage between the pair of current collectors 20 and 30 to cause a direct current to flow therebetween, a positive electrode active material and a negative electrode active material are formed in the vicinities of the current collectors 20 and 30 in the solid electrolyte portion 10. Therefore, a position where a positive electrode or a negative electrode is formed, that is, whether a position is at a face 10a side or a face 10b side is determined by the direction of the direct current flow. Due to this, in the following description, for convenience, it is assumed that in the solid electrolyte portion 10, the positive electrode is formed at the face 10a side, that is, at a current collector 20 side, and the negative electrode is formed at the face 10b side, that is, at a current collector 30 side.

The lithium battery 100 has, for example, a circular disk shape, and the size of the outer shape thereof is such that the diameter is about 7 mm and the thickness is about 80 μm. In addition to being small and thin, the lithium battery 100 can be charged and discharged, and is capable of obtaining a large output energy, and therefore can be favorably used as a power supply source for a portable information terminal or the like. The shape of the lithium battery 100 is not limited to a circular disk shape, and may be, for example, a polygonal disk shape. Such a thin lithium battery 100 may be used singly or may be used as a stacked body in which a plurality of lithium batteries 100 are coupled in series or in parallel.

Current Collector

In the current collectors 20 and 30, any forming material can be favorably used as long as it is a forming material that does not cause an electrochemical reaction with the solid electrolyte portion 10 and a positive electrode and a negative electrode to be formed in the solid electrolyte portion 10 and has an electron conduction property. As the forming material of the current collectors 20 and 30, for example, one type of metal simple substance among copper (Cu), magnesium (Mg), titanium (Ti), iron (Fe), cobalt (Co), nickel (Ni), zinc (Zn), aluminum (Al), germanium (Ge), indium (In), gold (Au), platinum (Pt), silver (Ag), and palladium (Pd), an alloy containing one or more types of metal elements among the above-mentioned metal simple substances, an electrically conductive metal oxide such as ITO (Tin-doped Indium Oxide), ATO (Antimony-doped Tin Oxide), and FTO (Fluorine-doped Tin Oxide), a metal nitride such as titanium nitride (TiN), zirconium nitride (ZrN), and tantalum nitride (TaN), etc. are exemplified.

As the form of the current collectors 20 and 30, other than a thin film of the above-mentioned forming material having an electron conduction property, an appropriate form such as a metal foil, a plate shape, a net shape or a lattice shape, a paste obtained by kneading an electrically conductive fine powder with a binder, or the like can be selected according to the intended purpose. The thickness of the current collectors 20 and 30 is not particularly limited, but is, for example, about 20 μm. The formation of the current collectors 20 and 30 may be performed either after or before forming the solid electrolyte portion 10.

Solid Electrolyte Portion

The solid electrolyte portion 10 contains a lithium composite metal oxide represented by the following compositional formula (1) (hereinafter also simply referred to as "the lithium composite metal oxide of the compositional formula (1)").

$$Li_{7-x}La_3Zr_{2-(x+y)}Ma_xMb_yO_{12} \quad (1)$$

Provided that $0.5 < x+y < 1.2$ and $(ix+jy)+4(x+y) > 8$ wherein i is an oxidation number of Ma and j is an oxidation number of Mb are satisfied, and Ma represents one or more types of Sb, Bi, Ce, Mn, V, Te, Tc, and Sn, and Mb represents one or more types of Nb, Cr, Mo, W, Ta, and Ti.

To the lithium composite metal oxide represented by the compositional formula (1), elements Ma and Mb are added. As the elements Ma and Mb, elements causing a potential difference by being subjected to redox, in other words, having different redox potentials are selected. That is, an element Ma whose redox potential is a large value and an element Mb whose redox potential is a small value are used.

According to this, by applying a polarizing voltage between the pair of current collectors 20 and 30 to cause a direct current to flow therebetween, the elements Ma and Mb, etc. that were not incorporated in a solid electrolyte constituting the solid electrolyte portion 10 are deposited at a crystal grain boundary of the lithium composite metal oxide and converted into active materials. That is, a positive electrode active material containing the element Ma is generated at the face 10a side in the solid electrolyte portion 10, and a negative electrode active material containing the element Mb is generated at the face 10b side in the solid electrolyte portion 10. In this manner, a positive electrode and a negative electrode are formed in the solid electrolyte portion 10.

As the elements Ma and Mb, elements that do not make the solid electrolyte portion 10 exhibit an electron conduction property and also that do not deteriorate the lithium ion conduction property of the solid electrolyte portion 10 are selected. Specifically, as the element Ma, one or more types of Sb (antimony) ($Sb^{5+}$ to $Sb^{3+}$: about 0.7 V), Bi (bismuth) ($Bi^{3+}$ to $Bi^+$: about 0.31 V), Ce (cerium) ($Ce^{4+}$ to $Ce^{3+}$: about 1.7 V), Mn (manganese) ($Mn^{3+}$ to $Mn^{2+}$: about 1.5 V), V (vanadium) ($V^{5+}$ to $V^{3+}$: about 0.96 V), Te (tellurium) ($Te^{6+}$ to $Te^{4+}$: about 0.93 V), Tc (technetium) ($Tc^{7+}$ to $Tc^{4+}$: about 0.74 V), and Sn (tin) ($Sn^{4+}$ to $Sn^{2+}$: about 0.15 V) are exemplified. As the element Mb, one or more types of Nb (niobium) ($Nb^{5+}$ to $Nb^{3+}$: about −0.25 V), Cr (chromium) ($Cr^{3+}$ to $Cr^{2+}$: about −0.42 V), Mo (molybdenum) ($Mo^{4+}$ to $Mo^{3+}$: about −0.01 V), W (tungsten) ($W^{5+}$ to $W^{4+}$: about −0.03 V), Ta (tantalum) ($Ta^{5+}$ to $Ta^{3+}$: about −0.81 V), and Ti (titanium) ($Ti^{4+}$ to $Ti^{3+}$: about −0.67 V) are exemplified. The numerical value in the parentheses following the name of the element described above denotes the redox potential of each element.

In the compositional formula (1), x and y are arbitrary real numbers satisfying the relational formulae: $0.5 < x+y < 1.2$ and $(ix+jy)+4(x+y) > 8$ wherein i is an oxidation number of Ma and j is an oxidation number of Mb. According to this, in the solid electrolyte portion 10, the element Ma and the element Mb are converted into active materials, and also the lithium ion conduction property is improved to ensure the charge-discharge rate. That is, a function as the lithium battery 100 can be favorably exhibited.

The numbers of moles of the elements Ma and Mb deposited at a crystal grain boundary of the lithium composite metal oxide of the compositional formula (1) preferably satisfy $ix=jy$, and the efficiency of the battery reaction in the secondary battery at this time is improved. However, in a process for producing the solid electrolyte portion 10, the molar ratio of the elements Ma and Mb to be incorporated inside the crystal of the lithium composite metal oxide of the compositional formula (1) changes according to the combination of the elements Ma and Mb. Therefore, $ix=jy$ may not necessarily be satisfied.

It is preferred that among the above-mentioned elements, in the compositional formula (1), the element Ma is Sb (antimony), the element Mb is Ta (tantalum), and x and y are arbitrary real numbers satisfying the relational formulae: $0.5 < x+y < 1.2$ and $(ix+jy)+4(x+y) > 8$ wherein i is an oxidation number of Sb and j is an oxidation number of Ta. According to this, the difference in redox potential between the element Ma and the element Mb is about 1.51 V. Therefore, by applying a polarizing voltage of about 1.51 V or more, a positive electrode active material containing Sb and a negative electrode active material containing Ta are generated and can be utilized as a secondary battery.

The thickness of the solid electrolyte portion 10 is preferably set to 0.5 μm or more and 30 μm or less. Further, a total ion conductivity as an index of the lithium ion conduction property of the solid electrolyte portion 10 is preferably $1.0 \times 10^{-4}$ S/cm or more. According to this, the interface resistance of the lithium battery 100 can be further reduced. In the solid electrolyte portion 10, a solid electrolyte other than the lithium composite metal oxide of the compositional formula (1) may be contained.

When the thickness of the solid electrolyte portion 10 is less than 0.5 μm and is thin, a short circuit easily occurs between the positive electrode and the negative electrode formed by applying a polarizing voltage, and a stable battery operation may become difficult. Further, when the thickness of the solid electrolyte portion 10 exceeds 30 μm and is thick, the thickness of the solid electrolyte portion 10 becomes thick with respect to the thickness where the active materials of the positive electrode and the negative electrode are formed by applying a polarizing voltage. Therefore, a portion that does not contribute to the battery capacity in the volume of the lithium battery 100 becomes large, and therefore, it is not preferred in terms of capacity density.

Method for Producing Lithium Battery

Figure 2:
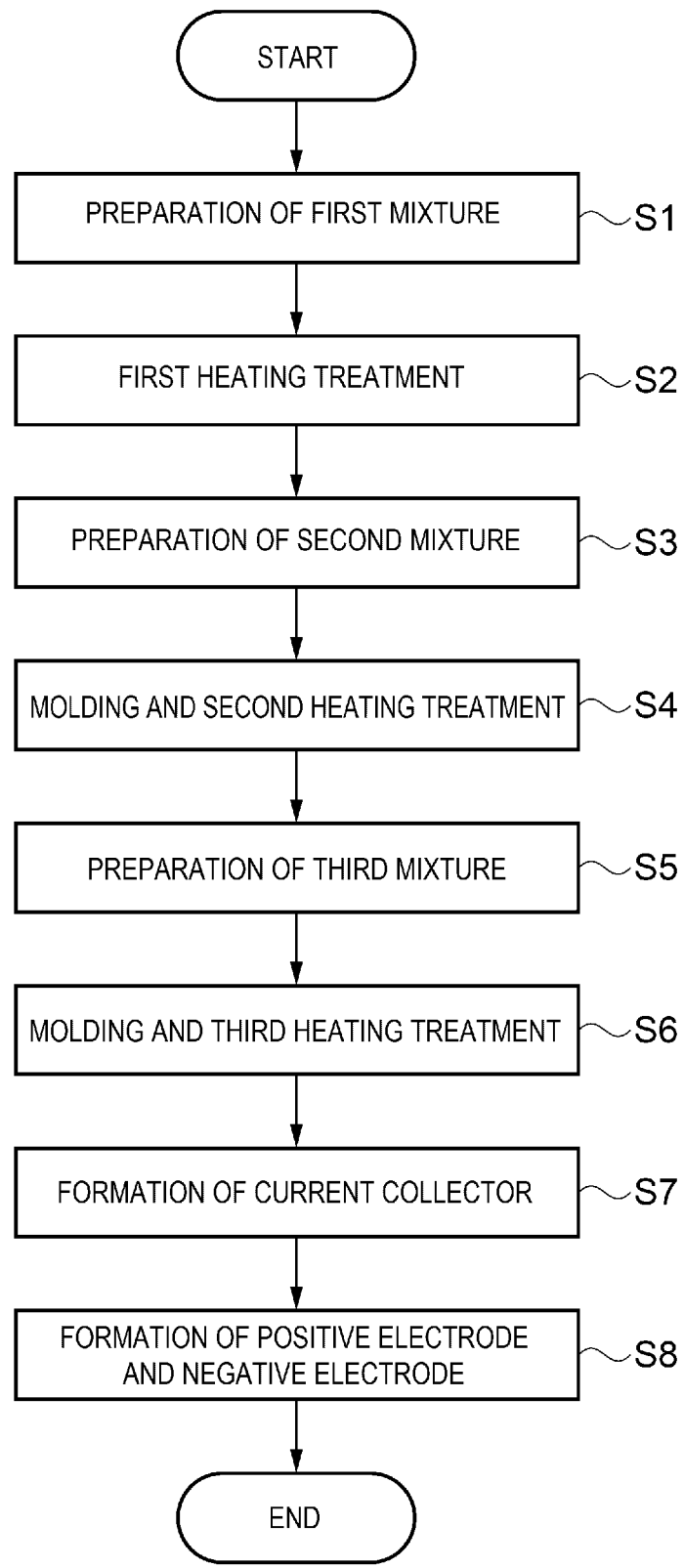
FIG. 2 is a process flow diagram showing a method for producing a lithium battery.

A method for producing the lithium battery 100 as the secondary battery according to this embodiment will be described with reference to FIGS. 2, 3A, 3B, 3C, 3D, 3E, 3F, and 3G. FIG. 2 is a process flow diagram showing a method for producing a lithium battery. FIGS. 3A to 3G are schematic views showing the method for producing a lithium battery. The process flow shown in FIG. 2 is one example, and the method is not limited thereto.

As shown in FIG. 2, the method for producing the lithium battery 100 of this embodiment includes the following steps. In Step S1 to Step S4, a solid electrolyte portion 10 containing a lithium composite metal oxide represented by the following compositional formula (1) is formed. In Step S5, a pair of current collectors 20 and 30 is formed so as to sandwich the solid electrolyte portion 10. In Step S6, a positive electrode and a negative electrode are formed by applying a polarizing voltage between the pair of current collectors 20 and 30 to cause a direct current to flow therebetween.

$$Li_{7-x}La_3Zr_{2-(x+y)}Ma_xMb_yO_{12} \qquad (1)$$

Provided that $0.5 < x+y < 1.2$ and $(ix+jy)+4(x+y) > 8$ wherein i is an oxidation number of Ma and j is an oxidation number of Mb are satisfied, and Ma represents one or more types of Sb, Bi, Ce, Mn, V, Te, Tc, and Sn, and Mb represents one or more types of Nb, Cr, Mo, W, Ta, and Ti.

Specifically, in Step S1, a plurality of types of raw materials containing elements constituting the lithium composite metal oxide represented by the compositional formula (1) are dissolved in a first solvent, followed by mixing, whereby a first mixture is prepared. In Step S2, the first mixture is subjected to a first heating treatment to cause a reaction, whereby a calcined body of the lithium composite metal oxide represented by the compositional formula (1) is formed. In Step S3, the calcined body is ground, followed by mixing with a second solvent and a first binder, whereby a second mixture is prepared. In Step S4, the prepared second mixture is molded, followed by being subjected to a second heating treatment. In Step S5, a fired body subjected to the second heating treatment is ground, followed by mixing with a third solvent and a second binder, whereby a third mixture is prepared. In Step S6, the third mixture is molded, followed by being subjected to a third heating treatment, whereby the solid electrolyte portion 10 is formed. In this embodiment, in Step S5 and Step S6, a so-called green sheet molding method is used. In this embodiment, the method for producing the solid electrolyte portion 10 by a green sheet molding method is described as an example, however, the method for producing the solid electrolyte portion 10 is not limited thereto.

Preparation of First Mixture

In Step S1, precursors as the raw materials of the lithium composite metal oxide of the compositional formula (1) are dissolved in a first solvent to form solutions, followed by mixing the solutions, whereby a first mixture is prepared. That is, the first mixture contains a solvent dissolving the precursors of the lithium composite metal oxide of the compositional formula (1). Here, the precursors of the lithium composite metal oxide of the compositional formula (1) are also simply referred to as "precursors".

As the precursors, metal compounds containing the elements constituting the lithium composite metal oxide of the compositional formula (1) are used. Here, in this embodiment, a composition in which in the compositional formula (1), the element Ma is Sb (antimony), the element Mb is Ta (tantalum), and $0.5 < x+y < 1.2$ and $(ix+jy)+4(x+y) > 8$ wherein i is an oxidation number of Sb and j is an oxidation number of Ta are satisfied will be described as an example. Note that each of the element Ma and the element Mb is not limited to one type of element, and two or more types of elements may be added, respectively.

As the metal compounds containing the elements constituting the lithium composite metal oxide of the compositional formula (1), a lithium compound, a lanthanum compound, a zirconium compound, an antimony compound, and a tantalum compound are used. The type of these compounds is not particularly limited, but is preferably one or more types of metal salts or metal alkoxides of lithium, lanthanum, zirconium, antimony, and tantalum.

Examples of the lithium compound include lithium metal salts such as lithium chloride, lithium nitrate, lithium acetate, lithium hydroxide, and lithium carbonate, and lithium alkoxides such as lithium methoxide, lithium ethoxide, lithium propoxide, lithium isopropoxide, lithium n-butoxide, lithium isobutoxide, lithium sec-butoxide, lithium tert-butoxide, and lithium dipivaloylmethanate, and one or more types in this group can be adopted.

Examples of the lanthanum compound include lanthanum metal salts such as lanthanum chloride, lanthanum nitrate, and lanthanum acetate, and lanthanum alkoxides such as lanthanum trimethoxide, lanthanum triethoxide, lanthanum tripropoxide, lanthanum triisopropoxide, lanthanum tri-n-butoxide, lanthanum triisobutoxide, lanthanum tri-sec-butoxide, lanthanum tri-tert-butoxide, and lanthanum tris(dipivaloylmethanate), and one or more types in this group can be adopted.

Examples of the zirconium compound include zirconium metal salts such as zirconium chloride, zirconium oxychloride, zirconium oxynitrate, zirconium oxyacetate, and zirconium acetate, and zirconium alkoxides such as zirconium tetramethoxide, zirconium tetraethoxide, zirconium tetrapropoxide, zirconium tetraisopropoxide, zirconium tetra-n-butoxide, zirconium tetraisobutoxide, zirconium tetra-sec-butoxide, zirconium tetra-tert-butoxide, and zirconium tetrakis(dipivaloylmethanate), and one or more types in this group can be adopted.

Examples of the antimony compound include antimony metal salts such as antimony chloride, antimony bromide, and antimony fluoride, and antimony alkoxides such as antimony trimethoxide, antimony triethoxide, antimony triisopropoxide, antimony tri-n-propoxide, antimony triisobutoxide, and antimony tri-n-butoxide, and one or more types in this group can be adopted.

Examples of the tantalum compound include tantalum metal salts such as tantalum chloride and tantalum bromide, and tantalum alkoxides such as tantalum pentamethoxide, tantalum pentaethoxide, tantalum pentaisopropoxide, tantalum penta-n-propoxide, tantalum pentaisobutoxide, tantalum penta-n-butoxide, tantalum penta-sec-butoxide, and tantalum penta-tert-butoxide, and one or more types in this group can be adopted.

When Bi (bismuth), Ce (cerium), Mn (manganese), V (vanadium), Te (tellurium), Tc (technetium), or Sn (tin) is used as the element Ma, as a compound thereof, for example, one or more types of metal salts or metal alkoxides of bismuth, cerium, manganese, vanadium, tellurium, technetium, or tin are adopted. Further, when Nb (niobium), Cr (chromium), Mo (molybdenum), W (tungsten), Ta (tantalum), or Ti (titanium) is used as the element Mb, as a compound thereof, for example, one or more types of metal salts or metal alkoxides of niobium, chromium, molybdenum, tungsten, tantalum, or titanium are adopted.

As the first solvent contained in the solutions containing the precursors, a single solvent of water or an organic solvent or a mixed solvent capable of dissolving the above-mentioned metal salt or metal alkoxide is used. The organic solvent is not particularly limited, however, examples thereof include alcohols such as methyl alcohol, ethyl alcohol, n-propyl alcohol, isopropyl alcohol, n-butyl alcohol (butanol), allyl alcohol, and ethylene glycol monobutyl ether (2-butoxyethanol), glycols such as ethylene glycol, propylene glycol, butylene glycol, hexylene glycol, pentanediol, hexanediol, heptanediol, and dipropylene glycol, ketones such as dimethyl ketone, methyl ethyl ketone, methyl propyl ketone, and methyl isobutyl ketone, esters such as methyl formate, ethyl formate, methyl acetate, and methyl acetoacetate, ethers such as diethylene glycol monomethyl ether, diethylene glycol monoethyl ether, diethylene glycol dimethyl ether, ethylene glycol monomethyl ether, ethylene glycol monoethyl ether, dipropylene glycol monomethyl ether, 1,4-dioxane, and tetrahydrofuran (THF), organic acids such as formic acid, acetic acid, 2-ethylbutyric acid, and propionic acid, aromatics such as toluene, o-xylene, and p-xylene, and amides such as formamide, N,N-dimethylformamide, N,N-diethylformamide, dimethylacetamide, and N-methylpyrrolidone. As the first solvent, a different type may be used for each precursor.

The precursors are dissolved in the above-mentioned first solvent, whereby a plurality of solutions (metal compound solutions) containing the respective precursors are prepared. Subsequently, the plurality of metal compound solutions are mixed, whereby a first mixture is prepared. At this time, lithium, lanthanum, zirconium, antimony, and tantalum are incorporated in the first mixture at a predetermined ratio according to the composition of the lithium composite metal oxide of the compositional formula (1). At this time, the first mixture may be prepared by mixing all the respective precursors, followed by dissolving in the first solvent without preparing a plurality of metal compound solutions containing the respective precursors.

Lithium in the composition is sometimes volatilized by heating in a post-process. Therefore, the lithium compound may be excessively blended in advance so that the content thereof in the first mixture is more by about 0.05 mol % to 30 mol % with respect to the desired composition according to the heating condition.

Figure 3A:
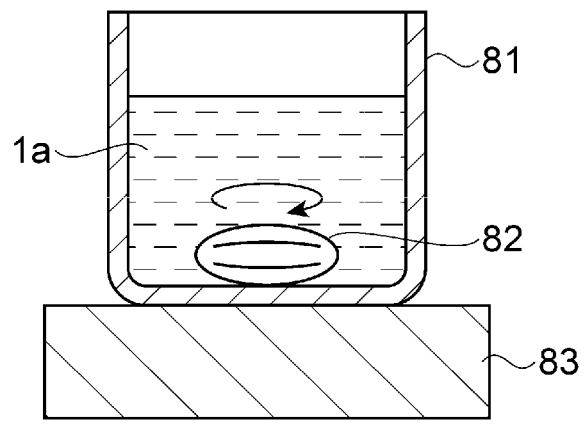
FIG. 3A is a schematic view showing the method for producing a lithium battery.

In the preparation of the first mixture, specifically, for example, as shown in FIG. 3A, the plurality of metal compound solutions each containing the respective precursors are placed in a beaker 81 made of Pyrex (registered trademark). A magnetic stirrer bar 82 is placed therein, and the solutions are mixed while stirring by a magnetic stirrer 83. By doing this, a first mixture 1a is obtained. Then, the process proceeds to Step S2.

First Heating Treatment

Figure 3B:
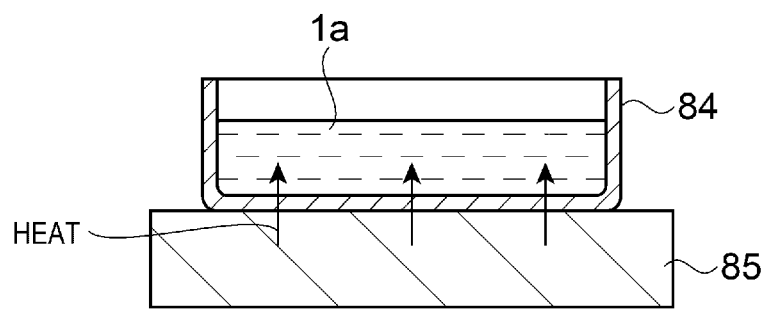
FIG. 3B is a schematic view showing the method for producing a lithium battery.

In Step S2, as shown in FIG. 3B, the first mixture 1a is heated, whereby removal of the solvent and decomposition of organic components are performed. Specifically, the first mixture 1a is placed in a dish 84 made of titanium having an inner diameter of 50 mm and a height of 20 mm, and the dish is placed on a hot plate 85 and heating is performed for 1 hour by setting the set temperature of the hot plate 85 to 200° C. so as to remove the solvent. Subsequently, heating is performed for 30 minutes by setting the set temperature of the hot plate 85 to 540° C. so as to decompose most of the organic components contained in the first mixture 1a by combustion, whereby a solid material 1b is obtained.

Figure 3C:
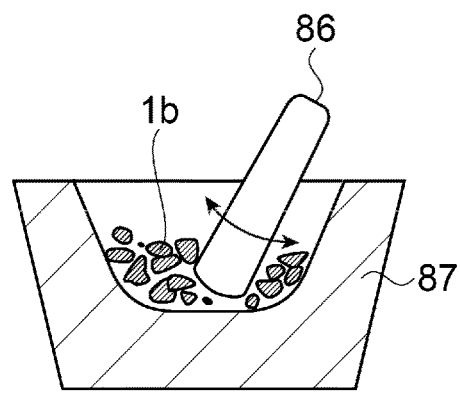
FIG. 3C is a schematic view showing the method for producing a lithium battery.

Subsequently, the solid material 1b is ground and mixed, and thereafter molded by pressurization. Specifically, first, as shown in FIG. 3C, the solid material 1b is sufficiently ground and mixed using an agate mortar 87 and an agate pestle 86.

Here, the average particle diameter of the ground and mixed solid material 1b is preferably set to 0.3 μm or more and 5 μm or less. It is more preferably 0.5 μm or more and 1 μm or less. By regulating the average particle diameter of the ground and mixed solid material 1b, a reaction of the solid material 1b in the below-mentioned first heating treatment is accelerated. The average particle diameter can be measured by, for example, dispersing the ground and mixed solid material 1b in n-octyl alcohol at a concentration within a range of 0.1 mass % or more and 10 mass % or less, and determining the median diameter using a light scattering grain size distribution analyzer, Nanotrac UPA-EX250 of Nikkiso Co., Ltd.

Figure 3D:
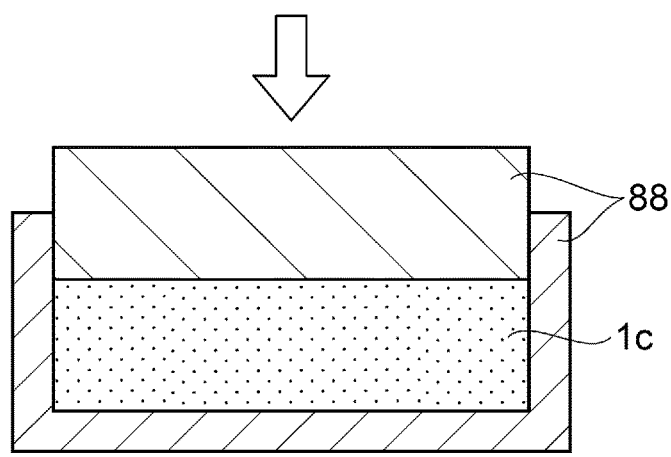
FIG. 3D is a schematic view showing the method for producing a lithium battery.

Subsequently, as shown in FIG. 3D, the ground and mixed solid material 1b is molded by pressurization using a handy press machine (not shown). Specifically, 0.2000 g of the ground and mixed solid material 1b is weighed and placed in a tablet molder 88 with a diameter of 10 mm. Subsequently, pressurization by a uniaxial press is performed for the tablet molder 88 using a handy press machine, whereby a molded material 1c of the solid material 1b is obtained. Specifically, in the pressurization, a pressure of 0.400 kN/mm$^2$ (400 MPa) is applied for 5 minutes using a uniaxial press. A pressurization time is not particularly limited, however, it is sufficient to ensure about 5 minutes or more, and the time is set to, for example, 4 minutes or more and 7 minutes or less.

Figure 3E:
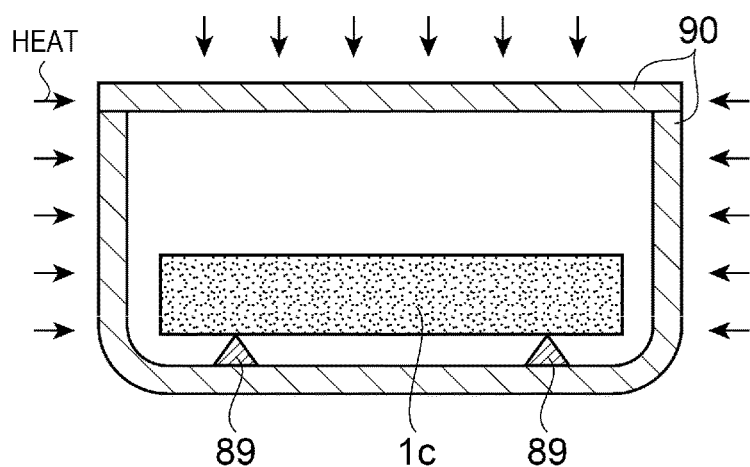
FIG. 3E is a schematic view showing the method for producing a lithium battery.

Subsequently, the molded material 1c is subjected to a first heating treatment. Specifically, as shown in FIG. 3E, the molded material 1c is placed in a pot 90 with a lid made of magnesium oxide through supports 89. Thereafter, the molded material together with the pot 90 is placed in an electric muffle furnace, and subjected to a first heating treatment, whereby a calcined body is formed. A temperature of the first heating treatment is preferably set to 200° C. or higher and 540° C. or lower. According to this, a reaction in the molded material 1c proceeds, and the lithium composite metal oxide of the compositional formula (1) is obtained as a calcined body. When the temperature of the first heating treatment is set lower than 200° C., an organic substance is not decomposed, the denseness of the solid electrolyte portion 10 is deteriorated, and the interface resistance is increased. When the temperature of the first heating treatment exceeds 540° C., the particles are coarsened to inhibit sintering, and the interface resistance of the solid electrolyte portion 10 is increased. A time of the first heating treatment is not particularly limited as long as the reaction sufficiently proceeds, but is, for example, 2 hours or more and 12 hours or less. Then, the process proceeds to Step S3.

Preparation of Second Mixture

In Step S3, first, the calcined body is sufficiently ground and mixed using an agate mortar 87 and an agate pestle 86 in the same manner as in Step S2 shown in FIG. 3C. The average particle diameter of the ground and mixed calcined body is preferably set to 0.3 μm or more and 5 μm or less. It is more preferably 0.5 μm or more and 1 μm or less. By regulating the average particle diameter of the ground and mixed calcined body, the below-mentioned bulk density can be regulated in the solid electrolyte portion 10. The average particle diameter of the ground and mixed calcined body can be measured by the above-mentioned method. In order to regulate the average particle diameter of the ground and mixed calcined body, a classification operation may be performed using a wet centrifuge or the like.

Subsequently, the ground and mixed calcined body is mixed with a second solvent and a first binder, whereby a second mixture in a slurry form is prepared. As the second solvent, water or an organic solvent similar to the above-mentioned first solvent can be adopted. As the first binder, a polymer compound such as polypropylene carbonate can be adopted. The second solvent may not dissolve the ground and mixed calcined body. Specifically, the ground and mixed calcined body and the second solvent are placed in a beaker 81 in the same manner as in Step S1 shown in FIG. 3A. A magnetic stirrer bar 82 is placed therein, and mixing is performed while stirring by a magnetic stirrer 83. By doing this, a second mixture 2a in a slurry form is obtained. Here, to the second mixture 2a, a dispersant, an antifoaming agent, or the like may be added as an auxiliary agent. Then, the process proceeds to Step S4.

Molding and Second Heating Treatment

In Step S4, the second mixture 2a is heated in the same manner as in Step S2 shown in FIG. 3B, whereby removal of the solvent, decomposition of organic components, and calcination are performed. Specifically, the second mixture 2a is placed in a dish 84 made of titanium having an inner diameter of 50 mm and a height of 20 mm, and the dish is placed on a hot plate 85 and heating is performed for 1 hour by setting the set temperature of the hot plate 85 to 200° C. so as to remove the solvent. Subsequently, heating is performed for 30 minutes by setting the set temperature of the hot plate 85 to 540° C. so as to decompose most of the organic components contained in the second mixture 2a by combustion.

Subsequently, the second mixture 2a is ground and mixed, and thereafter molded by pressurization. Specifically, the second mixture 2a is sufficiently ground and mixed using an agate mortar 87 and an agate pestle 86 in the same manner as in Step S3 shown in FIG. 3C.

Here, the average particle diameter of the ground and mixed second mixture 2a is preferably set to 0.3 µm or more and 5 µm or less. It is more preferably 0.5 µm or more and 1 µm or less. By regulating the average particle diameter of the ground and mixed second mixture 2a, a reaction in the below-mentioned second heating treatment is accelerated. The average particle diameter can be measured by the above-mentioned method.

Subsequently, the ground and mixed second mixture 2a is molded by pressurization using a handy press machine (not shown) in the same manner as in Step S4 shown in FIG. 3D. Specifically, 0.2000 g of the ground and mixed second mixture 2a is weighed and placed in a tablet molder 88 with a diameter of 10 mm. Subsequently, pressurization by a uniaxial press is performed for the tablet molder 88 using a handy press machine, whereby a molded material of the second mixture 2a is obtained. Specifically, in the pressurization, a pressure of 0.400 kN/mm$^2$ (400 MPa) is applied for 5 minutes using a uniaxial press. A pressurization time is not particularly limited, however, it is sufficient to ensure about 5 minutes or more, and the time is set to, for example, 4 minutes or more and 7 minutes or less.

Subsequently, the molded material of the second mixture 2a is subjected to a second heating treatment. Specifically, in the same manner as in Step S4 shown in FIG. 3E, the molded material of the second mixture 2a is placed in a pot 90 with a lid made of magnesium oxide through supports 89. Thereafter, the molded material together with the pot 90 is placed in an electric muffle furnace, and subjected to a second heating treatment, whereby a fired body is formed. A temperature of the second heating treatment is preferably set to 680° C. or higher and 1000° C. or lower. According to this, a reaction in the molded material of the second mixture 2a proceeds, and the lithium composite metal oxide of the compositional formula (1) is obtained as a fired body. When the temperature of the second heating treatment is set lower than 680° C., a crystal is not sufficiently produced, and the lithium ion conduction property of the solid electrolyte portion 10 is deteriorated. When the temperature of the second heating treatment exceeds 1000° C., lithium is likely to be volatilized, and the lithium ion conduction property of the solid electrolyte portion 10 is deteriorated. A time of the second heating treatment is not particularly limited as long as the reaction sufficiently proceeds, but is, for example, 1 hour or more and 12 hours or less. Then, the process proceeds to Step S5.

Preparation of Third Mixture

In Step S5, first, the fired body is sufficiently ground and mixed using an agate mortar 87 and an agate pestle 86 in the same manner as in Step S2 shown in FIG. 3C. The average particle diameter of the ground and mixed fired body is preferably set to 0.3 µm or more and 5 µm or less. It is more preferably 0.5 µm or more and 1 µm or less. By regulating the average particle diameter of the ground and mixed fired body, the below-mentioned bulk density can be regulated in the solid electrolyte portion 10. The average particle diameter of the ground and mixed fired body can be measured by the above-mentioned method. In order to regulate the average particle diameter of the ground and mixed fired body, a classification operation may be performed using a wet centrifuge or the like.

Subsequently, the ground and mixed fired body is mixed with a third solvent and a second binder, whereby a third mixture 3a in a slurry form is prepared. As the third solvent, water or an organic solvent similar to the above-mentioned first solvent can be adopted. As the second binder, a compound similar to the first binder can be adopted. The third solvent may not dissolve the ground and mixed fired body. Specifically, the ground and mixed fired body, the third solvent, and the second binder are placed in a beaker 81 in the same manner as in Step S1 shown in FIG. 3A. A magnetic stirrer bar 82 is placed therein, and mixing is performed while stirring by a magnetic stirrer 83. By doing this, a third mixture 3a in a slurry form is obtained. Here, to the third mixture 3a, a dispersant, an antifoaming agent, or the like may be added as an auxiliary agent. Then, the process proceeds to Step S6.

Molding and Third Heating Treatment

Figure 3F:
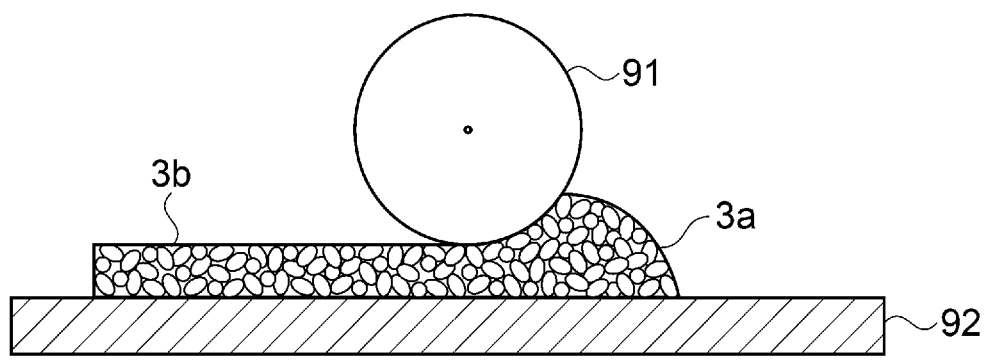
FIG. 3F is a schematic view showing the method for producing a lithium battery.

In Step S6, as shown in FIG. 3F, the third mixture 3a is molded into a molded body 3b in a sheet form by being coated on a base material 92 using a coating machine 91 such as a bar coater. At this time, the thickness of the molded body 3b is regulated so that the thickness of the solid electrolyte portion 10 is 0.5 µm or more and 30 µm or less. The thickness of the molded body 3b can be appropriately changed in response to the composition of the third mixture 3a, the performance of the coating machine 91, or the like.

Figure 3G:
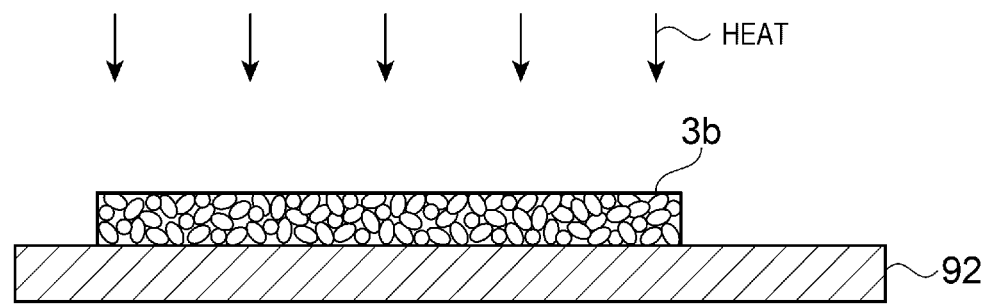
FIG. 3G is a schematic view showing the method for producing a lithium battery.

Subsequently, as shown in FIG. 3G, the third solvent and the like are volatilized by heating the molded body 3b. A heating temperature at this time is appropriately set according to the boiling point of the third solvent, vapor pressure, or the like. Thereafter, the molded body 3b is detached from the base material 92 and processed into a desired shape (for example, a circular disk shape having a diameter of about 8.4 mm).

Subsequently, the processed molded body 3b is subjected to a third heating treatment, whereby the solid electrolyte portion 10 is formed. Specifically, in the same manner as in Step S4 shown in FIG. 3E, the processed molded body 3b is placed in a pot 90 with a lid made of magnesium oxide through supports 89. Thereafter, the molded body together with the pot 90 is placed in an electric muffle furnace, and subjected to a third heating treatment to effect sintering. A temperature of the third heating treatment is preferably set to 900° C. or higher and 1200° C. or lower. When the temperature of the third heating treatment is set lower than 900° C., sintering does not sufficiently proceed, and the lithium ion conduction property of the solid electrolyte portion 10 is deteriorated. When the temperature of the third heating treatment exceeds 1200° C., lithium is volatilized, and the lithium ion conduction property of the solid electrolyte portion 10 is deteriorated. A time of the third heating treatment is not particularly limited as long as sintering sufficiently proceeds, but is, for example, 2 hours or more and 24 hours or less.

Here, the bulk density of the solid electrolyte portion 10 is preferably set to 70% or more and 100% or less. According to this, generation of a void in the solid electrolyte portion 10 can be suppressed. The bulk density can be determined from the following mathematical formula (A).

$$\beta = \{w/(v \cdot \rho)\} \times 100 \quad (A)$$

In the formula, β represents a bulk density (%), v represents an apparent volume including voids of the calcined body, w represents a mass of the calcined body, and ρ represents a density of the solid material 1*b*.

By the third heating treatment, sintering of the lithium composite metal oxide of the compositional formula (1) in the molded body 3*b* is accelerated. According to this, in the solid electrolyte portion 10, internal voids are reduced, and a denser structure than in the related art is formed. In this embodiment, the solid electrolyte portion 10 is formed from the mixture of the metal compound solutions containing the precursors, that is, from the first mixture 1*a*, however, the method for forming the solid electrolyte portion 10 is not limited thereto. As other methods for forming the solid electrolyte portion 10, a wet method such as a sol-gel method, and a metal organic decomposition (MOD) method, and a dry method such as a solid-phase synthesis method are exemplified. Then, the process proceeds to Step S7.

Formation of Current Collector

In Step S7, the current collectors 20 and 30 are formed at the solid electrolyte portion 10. First, the faces 10*a* and 10*b* of the solid electrolyte portion 10 are subjected to a polishing process. At this time, by the polishing process, the smoothness of the faces 10*a* and 10*b* is improved, and a contact area between the face 10*a* or 10*b* and the current collector 20 or 30 is expanded. When the faces 10*a* and 10*b* have sufficient smoothness after finishing Step S4, this polishing process may be omitted.

Subsequently, the current collector 20 is formed at the face 10*a* and the current collector 30 is formed at the face 10*b*. As a method for forming the current collectors 20 and 30, a method in which an appropriate adhesive layer is separately provided to effect adhesion, a gas-phase deposition method such as a PVD (Physical Vapor Deposition) method, a CVD (Chemical Vapor Deposition) method, a PLD (Pulsed Laser Deposition) method, an ALD (Atomic Layer Deposition) method, and an aerosol deposition method, a wet method such as a sol-gel method, a metal organic decomposition method, and plating, etc. are exemplified, and an appropriate method can be used according to the reactivity with a forming face, an electrical conduction property desired for the electrical circuit, and the design of the electrical circuit. Further, as the forming material of the current collectors 20 and 30, the above-mentioned forming material can be adopted. Then, the process proceeds to Step S8.

Formation of Positive Electrode and Negative Electrode

In Step S8, a positive electrode and a negative electrode are formed in the solid electrolyte portion 10 by applying a polarizing voltage to the solid electrolyte portion 10 between the current collector 20 and the current collector 30 to cause a direct current to flow therebetween. In more detail, the current collectors 20 and 30 are coupled to a device capable of applying a polarizing voltage such as SourceMeter (registered trademark) of Keithley Instruments Incorporated. Here, the polarizing voltage as used herein refers to a voltage for polarizing the vicinities of the current collectors 20 and 30 in the solid electrolyte portion 10 into a positive electrode and a negative electrode. Therefore, the polarizing voltage is set not lower than the difference in redox potential between the element Ma and the element Mb in the compositional formula (1).

First, a polarizing voltage is applied so as to cause a potential difference between the current collector 20 and the current collector 30, thereby causing a direct current to flow therebetween. At this time, the direction of the direct current flow in the solid electrolyte portion 10 is determined to be a direction from a current collector 20 side where a positive electrode is formed to a current collector 30 side where a negative electrode is formed. That is, this direction is the same as a current direction when charging the lithium battery 100. The polarizing voltage is appropriately determined according to the redox potentials of the elements Ma and Mb in the compositional formula (1), but is preferably set to 0.5 V or more and 6.0 V or less for one solid electrolyte portion 10. According to this, the production of a positive electrode active material containing the element Ma and a negative electrode active material containing the element Mb is accelerated.

By applying a polarizing voltage to the solid electrolyte portion 10, a positive electrode active material containing Sb is produced in a region from the face 10*a* to the thickness of approximately 0.1 μm in the solid electrolyte portion 10, whereby a positive electrode is formed. At the same time, a negative electrode active material containing Ta is produced in a region from the face 10*b* to the thickness of approximately 0.1 μm in the solid electrolyte portion 10, whereby a negative electrode is formed. This is derived from the difference in redox potential between Sb and Ta. That is, Sb that is the element Ma having a large redox potential is contained in the positive electrode active material, and Ta that is the element Mb having a small redox potential is contained in the negative electrode active material. By undergoing the above-mentioned steps, the lithium battery 100 is produced.

The structure before and after forming the positive electrode and the negative electrode in the solid electrolyte portion 10 can be confirmed by X-ray diffraction analysis, TEM (transmission electron microscope) observation, energy dispersive or wavelength dispersive X-ray spectroscopy, or the like.

As described above, the lithium battery 100 and the method for producing the lithium battery 100 according to the above-mentioned embodiment, the following effects can be obtained.

A battery reaction area of the lithium battery 100 can be expanded. In more detail, in the lithium composite metal oxide represented by the compositional formula (1), lithium lanthanum zirconate is partially substituted with Sb as the element Ma and Ta as the element Mb. Sb and Ta have different redox potentials. Therefore, when a potential for polarizing into a positive electrode and a negative electrode, that is, a polarizing voltage is applied to the pair of current collectors 20 and 30, in the solid electrolyte portion 10, a positive electrode active material containing Sb is generated at the face 10*a* in contact with the current collector 20 and the vicinity thereof. At the same time, in the solid electrolyte portion 10, a negative electrode active material containing Ta is generated at the face 10*b* in contact with the current collector 30 and the vicinity thereof. In this manner, a composite body such as a battery in the related art is not formed, and therefore, a void is less likely to be generated in the structure of the lithium battery 100. Due to this, as compared with a battery in the related art, a contact area between the positive electrode active material or the negative electrode active material and the solid electrolyte portion 10 is expanded and the interface resistance therebetween is reduced. Accordingly, the lithium battery 100 having a battery reaction area expanded more than in the related art can be provided.

Since a positive electrode and a negative electrode are formed by applying a polarizing voltage to the solid electrolyte portion 10 to cause a direct current to flow, a step of forming a positive electrode and a negative electrode can be simplified more than in the related art.

In the compositional formula (1), x and y are arbitrary real numbers satisfying the relational formulae: $0.5 < x+y < 1.2$ and $(ix+jy)+4(x+y) > 8$ wherein i is an oxidation number of Sb as the element Ma and j is an oxidation number of Ta as the element Mb. According to this, in the solid electrolyte portion 10, Sb and Ta are converted into active materials, and also the lithium ion conduction property is improved to ensure the charge-discharge rate. That is, the function as the lithium battery 100 can be favorably exhibited.

The difference in redox potential between Sb having a redox potential of about 0.7 V and Ta having a redox potential of about −0.81 V is about 1.51 V. Therefore, by applying a polarizing voltage of about 1.51 V or more, a positive electrode active material containing Sb and a negative electrode active material containing Ta are generated and can be utilized as a secondary battery.

Since the thickness of the solid electrolyte portion 10 is 0.5 μm or more, in the process for producing the lithium battery 100, breakage of the solid electrolyte portion 10 is reduced, and the ease of fabrication can be improved. By setting the thickness of the solid electrolyte portion 10 to 30 μm or less, a thin lithium battery 100 can be provided. Further, the active materials of the positive electrode and the negative electrode are formed from portions of the solid electrolyte portion 10, and therefore, a contact interface between the solid electrolyte portion 10 and the active material is favorably formed. Accordingly, the interface resistance is reduced, and the charge-discharge rate of the lithium battery 100 can be improved.

In the production process, a green sheet molding method is used. Therefore, the third mixture 3a having fluidity is prepared from the ground fired body and the third solvent. Due to this, the shape of the lithium battery 100 can be easily molded from the third mixture 3a. Further, the solid electrolyte portion 10 is fired by the third heating treatment, and sintering of the lithium composite metal oxide of the compositional formula (1) is accelerated. Accordingly, the lithium ion conduction property of the solid electrolyte portion 10 can be improved.

In Step S8 of forming a positive electrode and a negative electrode, the polarizing voltage is applied at 0.5 V or more and 6.0 V or less, and therefore, production of a positive electrode active material containing Sb and a negative electrode active material containing Ta is accelerated, and a time of applying the polarizing voltage can be reduced.

By the first heating treatment, an organic substance such as an impurity contained in the first mixture 1a is decomposed and reduced. Therefore, in the second heating treatment and the third heating treatment, the solid electrolyte portion 10 is formed while increasing the purity. In addition to this, by setting the temperature of the first heating treatment, the second heating treatment, and the third heating treatment to 1200° C. or lower, the occurrence of a side reaction at the crystal grain boundary or volatilization of lithium is suppressed. Accordingly, the lithium battery 100 having a further improved lithium ion conduction property can be produced.

Figures 4, 5A:
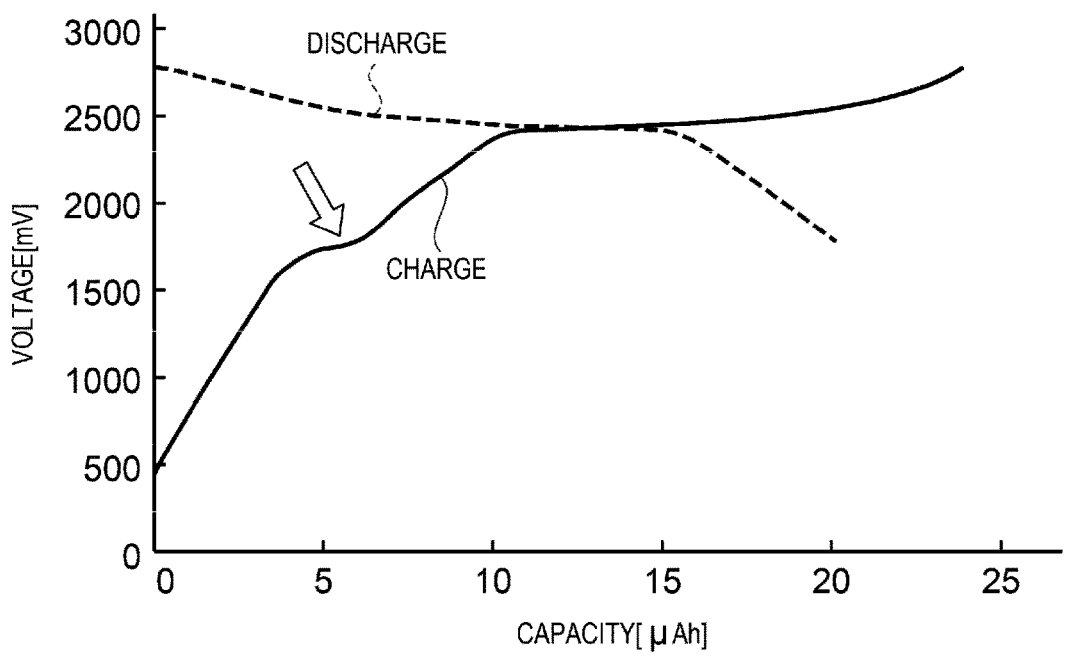
FIG. 4 is a table showing configurations and evaluation results of lithium batteries according to Examples and Comparative Example.
FIG. 5A is a graph showing charge-discharge characteristics of a lithium battery according to Example 5.

Next, the effects of the above-mentioned embodiment will be more specifically described by showing Examples and Comparative Example with respect to the lithium battery 100 of the above-mentioned embodiment. FIG. 4 is a table showing the configurations of lithium batteries and the evaluation result according to Examples and Comparative Example. The weight measurement in the following experiment was performed to the first decimal place using an analytical balance ME2041 of Mettler Toledo International, Inc.

EXAMPLES

Production of Lithium Battery
Preparation of Metal Compound Solution

First, metal compound solutions were prepared from precursors of the lithium composite metal oxide of the compositional formula (1) and a first solvent. As the precursors, a lithium compound, a lanthanum compound, a zirconium compound, an antimony compound, and a tantalum compound described below were used.

2-Butoxyethanol Solution of 1 mol/kg Lithium Nitrate

In a 30-g reagent bottle made of Pyrex (registered trademark) in which a magnetic stirrer bar was placed, 1.3789 g of lithium nitrate 3N5 with a purity of 99.95% of Kanto Chemical Co., Inc. and 18.6211 g of 2-butoxyethanol (ethylene glycol monobutyl ether) Cica special grade of Kanto Chemical Co., Inc. were weighed. Then, the bottle was placed on a magnetic stirrer with a hot plate function, and lithium nitrate was completely dissolved in 2-butoxyethanol while stirring at 190° C. for 1 hour. The resulting solution was gradually cooled to about 20° C., whereby a 2-butoxyethanol solution of 1 mol/kg lithium nitrate was obtained. The purity of lithium nitrate can be measured using an ion chromatography-mass spectrometer.

2-Butoxyethanol Solution of 1 mol/kg Lanthanum Nitrate Hexahydrate

In a 30-g reagent bottle made of Pyrex in which a magnetic stirrer bar was placed, 8.6608 g of lanthanum nitrate hexahydrate 4N of Kanto Chemical Co., Inc. and 11.3392 g of 2-butoxyethanol Cica special grade of Kanto Chemical Co., Inc. were weighed. Then, the bottle was placed on a magnetic stirrer with a hot plate function, and lanthanum nitrate hexahydrate was completely dissolved in 2-butoxyethanol while stirring at 140° C. for 30 minutes. The resulting solution was gradually cooled to room temperature, whereby a 2-butoxyethanol solution of 1 mol/kg lanthanum nitrate hexahydrate was obtained.

Butanol Solution of 1 mol/kg Zirconium Tetra-n-Butoxide

In a 20-g reagent bottle made of Pyrex in which a magnetic stirrer bar was placed, 3.8368 g of zirconium tetra-n-butoxide of Wako Pure Chemical Industries, Ltd. and 6.1632 g of butanol (n-butanol) were weighed. Then, the bottle was placed on a magnetic stirrer, and zirconium tetra-n-butoxide was completely dissolved in butanol while stirring at room temperature for 30 minutes, whereby a butanol solution of 1 mol/kg zirconium tetra-n-butoxide was obtained.

2-Butoxyethanol Solution of 1 mol/kg Antimony tri-n-Butoxide

In a 20-g reagent bottle made of Pyrex in which a magnetic stirrer bar was placed, 3.4110 g of antimony tri-n-butoxide of Wako Pure Chemical Industries, Ltd. and 6.5890 g of 2-butoxyethanol Cica special grade of Kanto Chemical Co., Inc. were weighed. Then, the bottle was placed on a magnetic stirrer, and antimony tri-n-butoxide was completely dissolved in 2-butoxyethanol while stirring at room temperature for 30 minutes, whereby a 2-butoxyethanol solution of 1 mol/kg antimony tri-n-butoxide was obtained.

2-Butoxyethanol Solution of 1 mol/kg Tantalum Penta-n-Butoxide

In a 20-g reagent bottle made of Pyrex in which a magnetic stirrer bar was placed, 5.4640 g of tantalum penta-n-butoxide of Kojundo Chemical Lab. Co., Ltd. and 4.5360 g of 2-butoxyethanol Cica special grade were weighed. Then, the bottle was placed on a magnetic stirrer, and tantalum penta-n-butoxide was completely dissolved in 2-butoxyethanol while stirring at room temperature for 30 minutes, whereby a 2-butoxyethanol solution of 1 mol/kg tantalum penta-n-butoxide was obtained.

Preparation of First Mixture

Subsequently, a first mixture to be used for solid electrolyte portions of Examples 1 to 6 was prepared using the above-mentioned metal compound solutions. Here, Examples 1 to 6 are hereinafter also simply referred to as Examples. In Examples, the composition of the lithium composite metal oxide of the compositional formula (1) was determined to be $Li_{6.75}La_3Zr_{1.75}Sb_{0.5}Ta_{0.5}O_{12}$.

First Mixture of Examples

A first mixture containing the precursors of $Li_{6.75}La_3Zr_{1.75}Sb_{0.5}Ta_{0.5}O_{12}$ was prepared. First, 8.1000 g of the 2-butoxyethanol solution of 1 mol/kg lithium nitrate, 3.0000 g of the 2-butoxyethanol solution of 1 mol/kg lanthanum nitrate hexahydrate, 1.7500 g of the butanol solution of 1 mol/kg zirconium tetra-n-butoxide, 0.5000 g of the 2-butoxyethanol solution of 1 mol/kg antimony tri-n-butoxide, and 0.5000 g of the 2-butoxyethanol solution of 1 mol/kg tantalum penta-n-butoxide were weighed in a beaker made of glass, and a magnetic stirrer bar was placed therein. Subsequently, stirring was performed at room temperature for 30 minutes using a magnetic stirrer, whereby the first mixture for Examples was obtained.

Here, in the first mixture of Examples, in consideration of the volatilization amount of lithium by heating in a post-process, the 2-butoxyethanol solution of 1 mol/kg lithium nitrate was blended in an amount 1.20 times the molar ratio with respect to the predetermined theoretical composition. The other metal compound solutions were blended in an equimolar ratio with respect to the theoretical composition.

Formation of Solid Electrolyte Portion

First, the first mixture of Examples was subjected to a first heating treatment, whereby a solid material was obtained. Specifically, the first mixture was placed in a dish made of titanium having an inner diameter of 50 mm and a height of 20 mm. This dish was placed on a hot plate and heated for 1 hour by setting the set temperature of the hot plate to 200° C. so as to remove the solvent. Subsequently, the dish was heated for 30 minutes by setting the set temperature of the hot plate to 540° C. so as to burn and decompose the remaining organic components. Thereafter, the dish was gradually cooled to room temperature on the hot plate, whereby a solid material was obtained.

Subsequently, the solid material was transferred to an agate mortar and sufficiently ground and mixed. A 0.2000-g portion was weighed out and pressurized at a pressure of 0.400 kN/mm² (400 MPa) for 5 minutes using a tablet molder, specifically, a die with an exhaust port having an inner diameter of 10 mm and a handy press machine, whereby a molded material was formed.

Subsequently, the molded material was subjected to the first heating treatment. Specifically, the molded material was placed in a pot made of magnesium oxide, and the pot was covered with a lid made of magnesium oxide. The molded material in this state was placed in an electric muffle furnace FP311 of Yamato Scientific Co., Ltd., and subjected to the first heating treatment at 540° C. for 4 hours. Thereafter, the electric muffle furnace was gradually cooled to room temperature, and then, a calcined body was taken out, whereby the calcined body having a diameter of about 9.5 mm and a thickness of about 800 μm was obtained.

Subsequently, the calcined body was transferred to an agate mortar and sufficiently ground and mixed. First, it was confirmed that the average particle diameter of the ground and mixed calcined body was 0.5 μm or more and 1 μm or less by the above-mentioned method. Thereafter, 10 g of polypropylene carbonate of Sigma-Aldrich Co. LLC as a first binder was dissolved in 90 g of an organic solvent 1,4-dioxane of Kanto Chemical Co., Inc. as a second solvent, whereby a solution was prepared. This solution and 15 g of the ground and mixed calcined body were placed in a beaker and mixed while stirring, whereby a second mixture in a slurry form was obtained.

Subsequently, the second mixture was placed in a dish made of titanium having an inner diameter of 50 mm and a height of 20 mm, and the dish was placed on a hot plate and heated for 1 hour by setting the set temperature of the hot plate to 200° C. so as to remove the solvent. Subsequently, the dish was heated for 30 minutes by setting the set temperature of the hot plate 85 to 540° C. so as to decompose most of the organic components contained in the second mixture by combustion.

Subsequently, the solid material was transferred to an agate mortar and sufficiently ground and mixed. A 0.2000-g portion was weighed out and pressurized at a pressure of 0.400 kN/mm² (400 MPa) for 5 minutes using a tablet molder, specifically, a die with an exhaust port having an inner diameter of 10 mm and a handy press machine, whereby a molded body was formed.

Subsequently, the molded body was subjected to a second heating treatment. Specifically, the molded body was placed in a pot made of magnesium oxide, and the pot was covered with a lid made of magnesium oxide. The molded body in this state was placed in an electric muffle furnace FP311 (product name, Yamato Scientific Co., Ltd.), and subjected to the second heating treatment at 1000° C. for 8 hours. Thereafter, the electric muffle furnace was gradually cooled to room temperature, and then, a fired body was taken out.

Subsequently, the fired body was transferred to an agate mortar and sufficiently ground and mixed. First, it was confirmed that the average particle diameter of the ground and mixed fired body was 0.5 μm or more and 1 μm or less by the above-mentioned method. Thereafter, 10 g of polypropylene carbonate of Sigma-Aldrich Co. LLC as a second binder was dissolved in 90 g of an organic solvent 1,4-dioxane of Kanto Chemical Co., Inc. as a third solvent, whereby a solution was prepared. This solution and 15 g of the ground and mixed fired body were placed in a beaker and mixed while stirring, whereby a third mixture in a slurry form was obtained.

Subsequently, the third mixture was molded into a molded body in a sheet form by being coated on a base material made of polyethylene terephthalate using a fully automatic film applicator of COTEC GmbH as a coating machine. At this time, a coating condition of the third mixture on the base material was adjusted so that the thickness of each of the lithium batteries of Examples 1 to 5 became a numerical value shown in FIG. 4. Thereafter, the molded body was dried at 80° C. for hours, and then, detached from the base material. Subsequently, the molded body was processed by being cut into a circular disk shape having a diameter of about 8.4 mm.

Subsequently, the molded body processed into a circular disk shape was subjected to a third heating treatment. Specifically, the processed molded body was placed in a pot made of magnesium oxide, and the pot was covered with a lid made of magnesium oxide. The molded body in this state was placed in an electric muffle furnace FP311 (product name, Yamato Scientific Co., Ltd.), and subjected to the third heating treatment at 1000° C. for 8 hours. Thereafter, the electric muffle furnace was gradually cooled to room temperature, and then, a solid electrolyte portion was taken out. By doing this, a solid electrolyte portion having a diameter of about 7 mm was obtained. Therefore, an electrode area of each of the lithium batteries of Examples becomes about 38.5 mm$^2$ (0.385 cm$^2$).

Formation of Current Collector

Subsequently, a current collector of a gold thin film having a diameter of 7 mm was formed by gold sputtering at both front and rear faces of the solid electrolyte portion. Application of a polarizing voltage to the solid electrolyte portion where the current collectors were formed, that is, causing of flow of a direct current is performed during the below-mentioned evaluation of the lithium battery. For convenience of explanation, the solid electrolyte portion where the current collectors were formed at a stage before applying the polarizing voltage is also sometimes referred to as "lithium battery". Further, in Example 6, a parallel-stack structure of 80 layers was formed using 80 lithium batteries of Example 2 having a thickness of 1.0 μm.

COMPARATIVE EXAMPLE

Production of Lithium Battery

First, a positive electrode layer was formed. Specifically, 10 g of polypropylene carbonate of Sigma-Aldrich Co. LLC as a binder was dissolved in 90 g of an organic solvent 1,4-dioxane of Kanto Chemical Co., Inc., whereby a solution was prepared. Subsequently, this solution and 15 g of LiCoO$_2$ powder having an average particle diameter of about 5 μm of Nippon Kayaku Co., Ltd. were placed in a beaker and mixed while stirring, whereby a slurry was obtained.

The slurry was molded into a sheet by being coated on a base material made of polyethylene terephthalate using a fully automatic film applicator of COTEC GmbH. At this time, a coating condition of the slurry on the base material was adjusted so that the thickness of the positive electrode layer in the lithium battery of Comparative Example became about 20 μm. A bulk density of the positive electrode layer after producing the lithium battery was measured by the above-mentioned measurement method and found to be about 50%.

Subsequently, a solid electrolyte layer was formed. Specifically, 10 g of polypropylene carbonate of Sigma-Aldrich Co. LLC as a binder was dissolved in 90 g of an organic solvent 1,4-dioxane of Kanto Chemical Co., Inc., whereby a solution was prepared. Subsequently, this solution and 15 g of Li$_{6.75}$La$_3$Zr$_{1.75}$Nb$_{0.25}$O$_{12}$ powder having an average particle diameter of about 5 μm of Toshima Manufacturing Co., Ltd. were placed in a beaker and mixed while stirring, whereby a slurry was obtained.

The slurry was molded into a sheet by being coated on a base material made of polyethylene terephthalate using a fully automatic film applicator of COTEC GmbH. At this time, a coating condition of the slurry on the base material was adjusted so that the thickness of the solid electrolyte layer in the lithium battery of Comparative Example became about 30 μm.

Subsequently, a negative electrode layer was formed. Specifically, 10 g of polypropylene carbonate of Sigma-Aldrich Co. LLC as a binder was dissolved in 90 g of an organic solvent 1,4-dioxane of Kanto Chemical Co., Inc., whereby a solution was prepared. Subsequently, this solution and 15 g of Li$_4$Ti$_5$O$_{12}$ powder having an average particle diameter of about 5 μm of Toshima Manufacturing Co., Ltd. were placed in a beaker and mixed while stirring, whereby a slurry was obtained.

The slurry was molded into a sheet by being coated on a base material made of polyethylene terephthalate using a fully automatic film applicator of COTEC GmbH. At this time, a coating condition of the slurry on the base material was adjusted so that the thickness of the negative electrode layer in the lithium battery of Comparative Example became about 20 μm.

Subsequently, the positive electrode layer, the solid electrolyte layer, and the negative electrode layer described above were stacked in the order of the positive electrode layer, the solid electrolyte layer, and the negative electrode layer, and adhered to one another by applying a pressure of 200 kPa in the stacking direction while heating to 80° C. Thereafter, the resulting material was processed by being cut into a circular disk shape having a diameter of about 8.4 mm, and then heated to 1000° C. for 6 hours. By doing this, the lithium battery of Comparative Example 1 having a diameter of about 7 mm was obtained. Therefore, an electrode area of the lithium battery of Comparative Example 1 becomes about 38.5 mm$^2$ (0.385 cm$^2$).

Subsequently, a current collector was formed at a positive electrode side and a negative electrode side. An Al foil having a thickness of about 5 μm was stacked at the positive electrode side and a Cu foil having a thickness of about 5 μm was stacked at the negative electrode side, whereby the lithium battery of Comparative Example 1 was obtained.

Evaluation of Lithium Battery

Interface Resistance

With respect to the lithium batteries, an interface resistance was measured. Specifically, with respect to the lithium batteries of Examples and Comparative Example, AC impedance measurement was performed using an impedance analyzer SI 1260 of Solartron, Inc. Thereafter, the lithium batteries were charged again and then discharged to a voltage between 2.0 V and 2.5 V at which a plateau portion of a discharging curve appears. Subsequently, AC impedance measurement was performed while applying the same DC bias voltage as the electromotive force of the lithium battery. In the measurement, the AC amplitude was set to 10 mV and the measurement frequency was set to 10$^7$ Hz to 10$^{-1}$ Hz. An interface resistance was read from a Cole-Cole plot that is the obtained impedance spectrum and the results are shown in FIG. 4.

As shown in FIG. 4, the interface resistances of the lithium batteries of Examples 1 to 4 were all 0.8 Ωcm$^2$, and favorable results were obtained, and it was shown that the battery reaction area is expanded. Further, the interface resistance of the lithium battery of Comparative Example was 200 Ωcm$^2$, and it was found that it is not suitable as a lithium battery.

Charge-Discharge Characteristics

With respect to the lithium batteries of Examples and Comparative Example, charge-discharge characteristics were examined. Specifically, each lithium battery in which a current was not caused to flow was coupled to SourceMeter (registered trademark) 2400 of Keithley Instruments Incorporated. Subsequently, a polarizing voltage of 4.1 V was applied, and a direct current of 50 μA was started to flow. Thereafter, a direct current was kept flowing even after the positive electrode and the negative electrode were formed in the solid electrolyte portion, and charging of each lithium battery was performed. Subsequently, charging was stopped when the charging voltage of the lithium battery reached 3.3 V or more, and discharging was performed at a discharging current of 10 μA. With respect to each lithium battery, the charge-discharge characteristics in the above-mentioned operation were obtained as a graph in which the horizontal axis represents a capacity (μAh) and the vertical axis represents a voltage (mV).

Figure 5B:
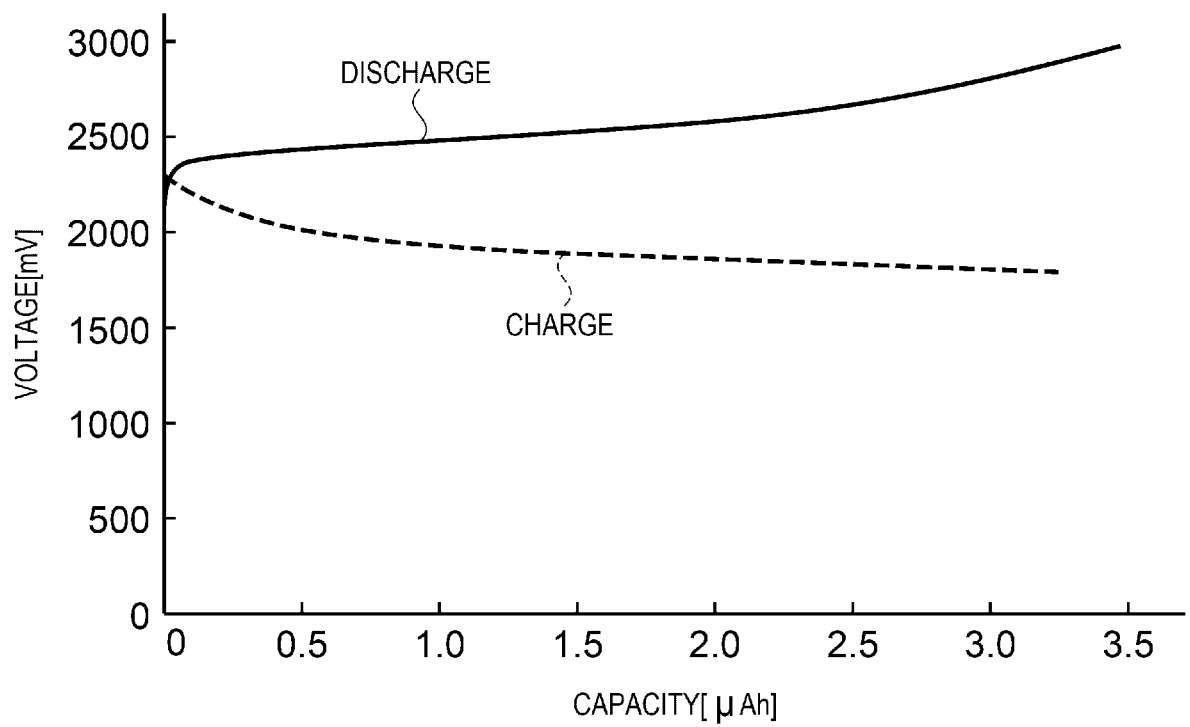
FIG. 5B is a graph showing charge-discharge characteristics of a lithium battery according to Comparative Example 1.

The obtained data of the charge-discharge characteristics had the same tendency in Examples although the values of the capacity were different. Therefore, Example 5 is shown in FIG. 5A as a representative example of Examples. FIG. 5A is a graph showing the charge-discharge characteristics of the lithium battery according to Example 5. Further, for comparison, the data of Comparative Example 1 are shown in FIG. 5B. FIG. 5B is a graph showing the charge-discharge characteristics of the lithium battery according to Comparative Example 1.

As shown in FIG. 5A, it is found that in the lithium battery of Example 5, by the initial current flow, first, polarization, that is, battery formation proceeds. That is, production of a positive electrode active material containing Sb and a negative electrode active material containing Ta proceeds at interfaces between each of the pair of current collectors and the solid electrolyte portion 10, respectively. This battery formation is completed around the point indicated by the arrow in the charging curve, and thereafter, usual charging behavior as a lithium battery proceeds. Particularly, battery formation behavior and charging behavior can be distinguished since the slopes of the graph are different. In this manner, it was shown that in the lithium batteries of Examples, by the initial current flow, a positive electrode active material and a negative electrode active material are produced, and battery formation proceeds.

On the other hand, as shown in FIG. 5B, in the lithium battery of Comparative Example 1, flatness is not observed in the discharge plateau portion and linear potential drop occurs, and therefore, the internal resistance is presumed to be high.

Capacity Density

In the evaluation of the charge-discharge characteristics described above, evaluation of the capacity density was also performed together. Specifically, a discharge capacity at an operating current density of 0.13 mAh/cm² was measured. The results and the capacity density calculated from the volume and the discharge capacity of the lithium battery are shown in FIG. 4.

As shown in FIG. 4, it was found that in the lithium batteries of Examples, as the thickness is smaller, the capacity density is improved. It was also found that as the thickness is larger, the discharge capacity is increased. Particularly, it was shown that in Example 6, both the capacity density and the discharge capacity are excellent as compared with Comparative Example 1 having the same thickness.

Second Embodiment

Lithium Battery

A secondary battery according to this embodiment will be described by showing a lithium battery as an example. Note that the same reference numerals are used for the same constituent portions as those of the first embodiment, and a repetitive description is omitted.

In the first embodiment, $Li_{6.75}La_3Zr_{1.75}Sb_{0.5}Ta_{0.5}O_{12}$ is shown as an example of the lithium composite metal oxide of the compositional formula (1), however, it is not limited thereto. By satisfying the compositional formula (1), the battery reaction area of a lithium battery can be expanded in the same manner as the first embodiment. Hereinafter, with respect to the lithium battery of this embodiment, Examples are shown and effects of this embodiment will be specifically described.

EXAMPLES

The lithium battery of this embodiment is different from Example 1 of the first embodiment in the lithium composite metal oxide of the compositional formula (1) contained in the solid electrolyte portion 10. In this embodiment, the composition of the lithium composite metal oxide of the compositional formula (1) was determined to be $Li_{6.6}La_3Zr_{1.3}Sb_{0.5}Ta_{0.2}O_{12}$. According to this, the difference in redox potential between the element Ma and the element Mb is about 1.51 V. Therefore, by applying a polarizing voltage of about 1.51 V or more, a positive electrode active material containing Sb and a negative electrode active material containing Ta are generated and can be utilized as a secondary battery. A lithium battery was produced in the same manner as in Example 1 of the first embodiment except that the composition of the lithium composite metal oxide of the compositional formula (1) was changed as described above, and used as a lithium battery of Example 7.

As another form of the lithium composite metal oxide of the compositional formula (1) of this embodiment, the element Ma is V (vanadium) and the element Mb is Nb (niobium). The lithium composite metal oxide of the compositional formula (1) composed of a combination of such elements Ma and Mb is not particularly limited. In this embodiment, it was determined to be $Li_{6.6}La_3Zr_{1.6}V_{0.4}Nb_{0.4}O_{12}$. According to this, the difference in redox potential between the element Ma and the element Mb is about 1.21V. Therefore, by applying a polarizing voltage of about 1.21 V or more, a positive electrode active material containing V and a negative electrode active material containing Nb are generated and can be utilized as a secondary battery. A lithium battery was produced in the same manner as in Example 1 of the first embodiment except that the composition of the lithium composite metal oxide of the compositional formula (1) was changed as described above, and used as a lithium battery of Example 8.

As a form other than the above-mentioned forms of the lithium composite metal oxide of the compositional formula (1) of this embodiment, the element Ma is Ce (cerium) and the element Mb is Mo (molybdenum). The lithium composite metal oxide of the compositional formula (1) composed of a combination of such elements Ma and Mb is not particularly limited. In this embodiment, it was determined to be $Li_{6.6}La_3Zr_{1.4}Ce_{0.6}Mo_{0.6}O_{12}$. According to this, the difference in redox potential between the element Ma and the element Mb is about 1.71 V. Therefore, by applying a polarizing voltage of about 1.71 V or more, a positive electrode active material containing Ce and a negative electrode active material containing Mo are generated and can be utilized as a secondary battery. A lithium battery was produced in the same manner as in Example 1 of the first embodiment except that the composition of the lithium composite metal oxide of the compositional formula (1) was changed as described above, and used as a lithium battery of Example 9.

As a form other than the above-mentioned forms of the lithium composite metal oxide of the compositional formula (1) of this embodiment, the element Ma is Te (tellurium) and the element Mb is Cr (chromium). The lithium composite metal oxide of the compositional formula (1) composed of a combination of such elements Ma and Mb is not particularly limited. In this embodiment, it was determined to be $Li_{6.6}La_3Zr_{1.4}Te_{0.2}Cr_{0.4}O_{12}$. According to this, the difference in redox potential between the element Ma and the element Mb is about 1.35 V. Therefore, by applying a polarizing voltage of about 1.35 V or more, a positive electrode active material containing Te and a negative electrode active material containing Cr are generated and can be utilized as a secondary battery. A lithium battery was produced in the same manner as in Example 1 of the first embodiment except that the composition of the lithium composite metal oxide of the compositional formula (1) was changed as described above, and used as a lithium battery of Example 10.

Evaluation of Lithium Battery

Total Ion Conductivity

With respect to the lithium batteries of Examples 7 to 10, a total ion conductivity was measured as an index of the lithium ion conduction property. Here, Examples 7 to 10 are hereinafter also simply referred to as Examples. Specifically, with respect to the lithium batteries of Examples, AC impedance measurement was performed using an impedance analyzer SI 1260 of Solartron, Inc. Thereafter, the lithium batteries were charged again and then discharged to a voltage from 2.0 V to 2.5 V at which a plateau portion of a discharging curve appears. Subsequently, AC impedance measurement was performed while applying the same DC bias voltage as the electromotive force of the lithium battery. In the measurement, the AC amplitude was set to 10 mV and the measurement frequency was set to $10^7$ Hz to $10^{-1}$ Hz. A total ion conductivity was read from a Cole-Cole plot that is the obtained impedance spectrum and the results are shown in FIG. 6.

As shown in FIG. 6, the total ion conductivities of the lithium batteries of Examples 7 to 10 were all $1.0 \times 10^{-4}$ S/cm or more, and it was shown that the lithium batteries have a favorable lithium ion conduction property.

Operating Voltage

With respect to the lithium batteries of Examples, an operating voltage was measured. Specifically, a Cu electrode was pressed against one face of the lithium battery, and a lithium metal foil was pressed against the other face thereof, a reference electrode and a counter electrode of a potentiostat AUTOLAB of Metrohm Autolab were coupled to a lithium metal foil side and a working electrode was coupled to a Cu electrode side, and a redox peak current was measured while sweeping a potential in a range from 0.0 V to 5.0 V. A potential at which a redox current peak at that time appears was determined to be an operating voltage. The results are shown in FIG. 6.

As shown in FIG. 6, the operating voltage of each of the lithium batteries of Examples 7 to 10 was ensured to be 1.5 V or more, and it was shown that the lithium batteries effectively function as secondary batteries.

Capacity Density

With respect to the lithium batteries of Examples, a capacity density as an index of the battery capacity was evaluated. Specifically, a discharge capacity was measured in the same manner as in Example 1 of the first embodiment.

The results and the capacity density calculated from the volume and the discharge capacity of the lithium battery are shown in FIG. 6. The thickness, electrode area, and volume of each of the lithium batteries of Examples 7 to 10 were made equal to those of the lithium battery of Example 1 of the first embodiment.

As shown in FIG. 6, in Examples 7 and 8, substantially the same capacity density as in Example 1 of the first embodiment was obtained, and in Example 9, substantially the same capacity density as in Example 3 of the first embodiment was obtained. In Example 10, a capacity density exceeding that in Example 1 was obtained. This showed that in the lithium batteries of Examples 7 to 10, the capacity density is improved in the same manner as in the first embodiment.

Third Embodiment

Method for Producing Lithium Battery

A method for producing a lithium battery as a secondary battery according to this embodiment will be described with reference to FIG. 7. FIG. 7 is a process flow diagram showing a method for producing a lithium battery as a secondary battery according to a third embodiment. The process flow shown in FIG. 7 is one example, and the method is not limited thereto. Further, the same reference numerals are used for the same constituent portions as those of the first embodiment, and a repetitive description is omitted.

The method for producing a lithium battery of this embodiment is different from the method for producing a lithium battery of the first embodiment in that the second mixture is not prepared from the ground and mixed calcined body and the second solvent. That is, in the method for producing a lithium battery of this embodiment, a molded body is formed by pressurizing the ground and mixed calcined body.

As shown in FIG. 7, the method for producing a lithium battery of this embodiment includes the following steps. In Step S11 to Step S13, a solid electrolyte portion containing a lithium composite metal oxide represented by the following compositional formula (1) is formed. In Step S14, a pair of current collectors is formed so as to sandwich the solid electrolyte portion. In Step S15, a positive electrode and a negative electrode are formed by applying a polarizing voltage between the pair of current collectors to cause a direct current to flow therebetween.

$$Li_{7-x}La_3Zr_{2-(x+y)}Ma_xMb_yO_{12} \qquad (1)$$

Provided that $0.5<x+y<1.2$ and $(ix+jy)+4(x+y)>8$ wherein i is an oxidation number of Ma and j is an oxidation number of Mb are satisfied, and Ma represents one or more types of Sb, Bi, Ce, Mn, V, Te, Tc, and Sn, and Mb represents one or more types of Nb, Cr, Mo, W, Ta, and Ti.

Specifically, in Step S11, a plurality of types of raw materials containing elements constituting the lithium composite metal oxide represented by the compositional formula (1) are dissolved in a first solvent, followed by mixing, whereby a first mixture is prepared. In Step S12, the first mixture is subjected to a first heating treatment to cause a reaction, whereby a calcined body of the lithium composite metal oxide represented by the compositional formula (1) is formed. In Step S13, the calcined body is ground, followed by pressurization, whereby a molded body is formed, and then, the molded body is subjected to a second heating treatment and a third heating treatment, whereby a solid electrolyte portion is prepared.

Here, in the method for producing a lithium battery of this embodiment, Steps S11, S12, S14, and S15 can be performed in the same manner as Steps S1, S2, S7, and S8, respectively, in the method for producing a lithium battery of the first embodiment. Therefore, hereinbelow, only Step S13 will be described, and a description of the other Steps S11, S12, S14, and S15 will be omitted.

Molding and Second Heating Treatment

In Step S13, the calcined body formed in Steps S11 and S12 is used. First, the calcined body is sufficiently ground and mixed using an agate mortar 87 and an agate pestle 86 in the same manner as in Step S2 shown in FIG. 3C. The average particle diameter of the ground and mixed calcined body is preferably set to 0.3 μm or more and 5 μm or less. It is more preferably 0.5 μm or more and 1 μm or less. By regulating the average particle diameter of the ground and mixed calcined body, the below-mentioned bulk density can be regulated in the solid electrolyte portion. The average particle diameter of the ground and mixed calcined body can be measured by the above-mentioned method. In order to regulate the average particle diameter of the ground and mixed calcined body, a classification operation may be performed using a wet centrifuge or the like.

Subsequently, the ground and mixed calcined body is molded by pressurization using a handy press machine. Specifically, 0.2000 g of the ground and mixed calcined body is weighed and placed in a tablet molder 88 (see FIG. 3D) with a diameter of 10 mm. Subsequently, uniaxial press (pressurization) is performed for the tablet molder 88 using a handy press machine, whereby a molded body of the calcined body is obtained. Specifically, in the pressurization, a pressure of 0.400 $kN/mm^2$ (400 MPa) is applied for 5 minutes using a uniaxial press. A pressurization time is not particularly limited, however, it is sufficient to ensure about 5 minutes or more, and the time may be, for example, 4 minutes or more and 7 minutes or less. At this time, it is preferred to adjust the bulk density of the solid electrolyte portion to be formed to a desired value by regulating the pressure or time of the pressurization.

Subsequently, the molded body is subjected to a second heating treatment and a third heating treatment, whereby a solid electrolyte portion is formed. Specifically, in the same manner as in Step S4 shown in FIG. 3E, the molded body is placed in a pot 90 with a lid made of magnesium oxide through supports 89. Thereafter, the molded body together with the pot 90 is placed in an electric muffle furnace, and subjected to a second heating treatment at 1000° C. for 8 hours to effect sintering. A temperature of the second heating treatment is set to 680° C. or higher and 1000° C. or lower. A time of the second heating treatment is not particularly limited as long as the sintering sufficiently proceeds, but is, for example, 2 hours or more and 16 hours or less. Further, the third heating treatment is performed as it is at 1000° C. for 8 hours to effect sintering. A temperature of the third heating treatment is set to 900° C. or higher and 1200° C. or lower. A time of the third heating treatment is not particularly limited as long as the sintering sufficiently proceeds, but is, for example, 2 hours or more and 16 hours or less. The second heating treatment and the third heating treatment may be performed in an integrated manner.

Here, the bulk density of the solid electrolyte portion is preferably set to 70% or more and 100% or less. According to this, generation of a void in the solid electrolyte portion can be suppressed. The bulk density of the solid electrolyte portion can be determined by the above-mentioned method.

Steps S14 and S15 thereafter are performed in the same manner as Steps S7 and S8 of the first embodiment as described above. By doing this, the lithium battery of this embodiment is produced.

As described above, by the method for producing a lithium battery according to this embodiment, in addition to the effects of the first embodiment, the following effect can be obtained. The shape of the lithium battery can be directly formed without dispersing the ground calcined body in a solvent or the like. That is, the operation of mixing the ground calcined body with a solvent and the operation of volatilizing the solvent are omitted, so that the production process can be simplified.

Fourth Embodiment

Electronic Apparatus

Figure 8:
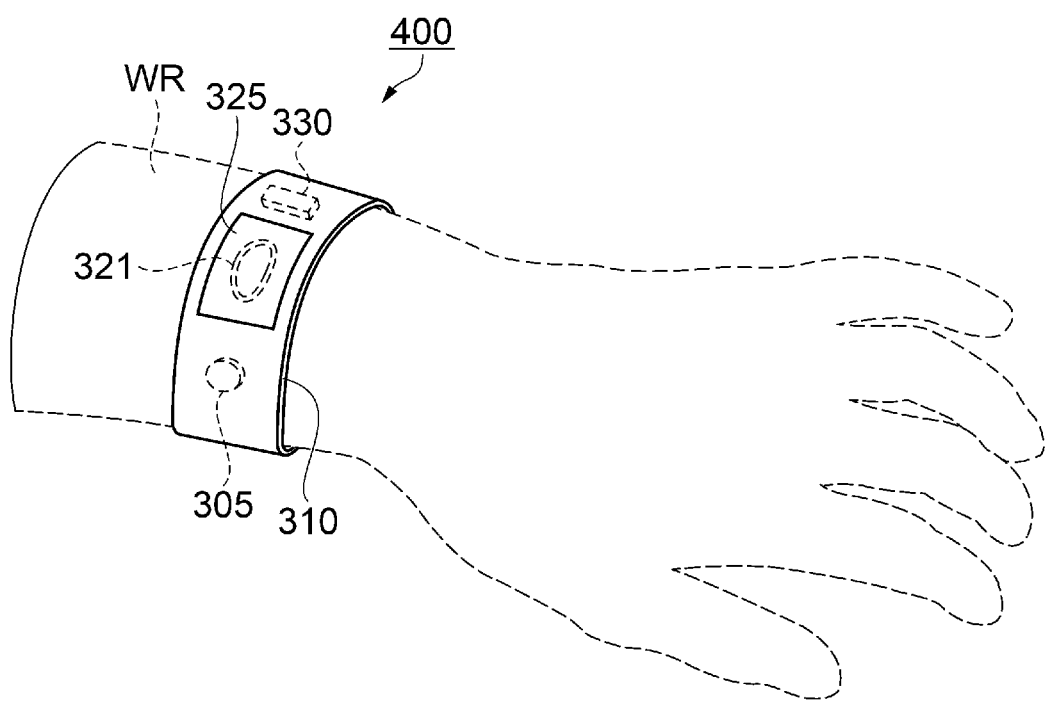
FIG. 8 is a schematic view showing a configuration of a wearable apparatus according to a fourth embodiment.

An electronic apparatus according to this embodiment will be described with reference to FIG. 8. In this embodiment, a wearable apparatus will be described as an example of the electronic apparatus. FIG. 8 is a schematic view showing a configuration of a wearable apparatus as the electronic apparatus according to a fourth embodiment.

As shown in FIG. 8, a wearable apparatus 400 of this embodiment is an information apparatus that is worn on, for example, the wrist WR of a human body using a band 310 like a watch, and that obtains information related to the human body. The wearable apparatus 400 includes a battery 305, a display portion 325, a sensor 321, and a processing portion 330. As the battery 305, a lithium battery as the secondary battery of the above-mentioned embodiment is used.

The band 310 is formed in a belt shape using a resin having flexibility such as rubber so as to come into close contact with the wrist WR when it is worn. In an end portion of the band 310, a binding portion (not shown) capable of adjusting the binding position according to the size of the wrist WR is provided.

The sensor 321 is disposed at an inner face side (a wrist WR side) of the band 310 so as to come into contact with the wrist WR when it is worn. The sensor 321 obtains information related to the pulse rate, the blood glucose level, or the like of the human body when it comes into contact with the wrist WR, and outputs the information to the processing portion 330. As the sensor 321, for example, an optical sensor is used.

The processing portion 330 is incorporated in the band 310, and is electrically coupled to the sensor 321 and the display portion 325. As the processing portion 330, for example, an integrated circuit (IC) is used. The processing portion 330 performs arithmetic processing of the pulse rate, the blood glucose level, or the like based on the output from the sensor 321, and outputs display data to the display portion 325.

The display portion 325 displays the display data such as the pulse rate or the blood glucose level output from the processing portion 330. As the display portion 325, for example, a light-receiving type liquid crystal display device is used. The display portion 325 is disposed at an outer face side of the band 310, that is, a side opposite to the inner face where the sensor 321 is disposed so that a wearer can read the display data when the wearer wears the wearable apparatus 400.

The battery 305 functions as a power supply source supplying power to the display portion 325, the sensor 321, and the processing portion 330. The battery 305 is incorporated in the band 310 in an attachable and detachable manner.

According to the above configuration, the wearable apparatus 400 can obtain information related to the pulse rate or the blood glucose level of a wearer from the wrist WR and can display it as information such as the pulse rate or the blood glucose level through arithmetic processing or the like. Further, to the wearable apparatus 400, the lithium battery of the above-mentioned embodiment having an improved lithium ion conduction property and an expanded battery reaction area in spite of having a small size is applied, and therefore, the weight can be reduced, and the operating time can be extended. Moreover, since the lithium battery of the above-mentioned embodiment is an all-solid-state secondary battery, the battery can be repeatedly used by charging, and also there is no concern about leakage of an electrolytic solution or the like, and therefore, the wearable apparatus 400 that can be used safely for a long period of time can be provided.

In this embodiment, a watch-type wearable apparatus is illustrated as the wearable apparatus 400, however, the apparatus is not limited thereto. The wearable apparatus may be a wearable apparatus to be worn on, for example, the ankle, head, ear, waist, or the like.

The electronic apparatus to which the lithium battery of the above-mentioned embodiment is applied as the power supply source is not limited to the wearable apparatus 400. As other electronic apparatuses, for example, a display to be worn on the head such as a head-mounted display, a head-up display, a portable telephone, a portable information terminal, a notebook personal computer, a digital camera, a video camera, a music player, a wireless headphone, a portable gaming machine, and the like are exemplified. These electronic apparatuses may have another function, for example, a data communication function, a gaming function, a recording and playback function, a dictionary function, or the like.

Further, the electronic apparatus of this embodiment is not limited to the use for general consumers and can also be applied to industrial use. Moreover, the apparatus to which the lithium battery of the above-mentioned embodiment is applied is not limited to electronic apparatuses. For example, the lithium battery of the above-mentioned embodiment may be applied as a power supply source for a moving object. Specific examples of the moving object include automobiles, motorcycles, forklifts, and flying objects such as unmanned planes. According to this, a moving object including a secondary battery having an expanded battery reaction area as a power supply source can be provided.

First Modification

Method for Producing Lithium Battery

In the formation of a solid electrolyte portion containing a lithium composite metal oxide of the compositional formula (1), a metal organic decomposition method (MOD method) may be used. Specifically, a solid electrolyte portion is directly formed on a substrate by a MOD method. In more detail, in the same manner as in the first embodiment, a first mixture is prepared from the above-mentioned lithium compound, lanthanum compound, zirconium compound, compound of the element Ma, compound of the element Mb, and first solvent. To the first mixture, a surfactant, a sintering aid, a chelating agent, or the like may be added.

The first mixture is coated on the substrate. As a method for coating the first mixture, spin coating, spray coating, or the like is used. As the substrate, an electrically conductive substrate of Ni (nickel), $SrTiO_3$ (strontium titanate), or the like, a noble metal thin plate, or an electrically conductive oxide thin plate can be adopted.

Subsequently, the substrate coated with the first mixture is placed into a lamp anneal furnace or the like and subjected to a heating treatment at a high temperature. A condition for the heating treatment is not particularly limited as long as the lithium composite metal oxide of the compositional formula (1) is synthesized, but is set to, for example, a temperature of 790° C. or higher and a time of 10 minutes or more. Thereafter, the substrate is cooled to about 25° C., whereby a thin film (solid electrolyte portion) of the lithium composite metal oxide of the compositional formula (1) is formed. A thickness of the thin film is not particularly limited, but is set to, for example, about 0.5 μm. The thickness of the thin film can be adjusted by the condition for coating the first mixture, and when spin coating is adopted, the number of revolutions per time and the coating time are adjusted.

Subsequently, a current collector is formed at the solid electrolyte portion. As a method for forming the current collector, the above-mentioned method can be adopted. First, in order to prevent breakage of the solid electrolyte portion, a current collector is formed at an exposed surface side without detaching the solid electrolyte portion from the substrate. Subsequently, the solid electrolyte portion is detached from the substrate and processed by being cut into a circular disk shape having a diameter of about 8.4 mm. Thereafter, at a face that was in contact with the substrate of the solid electrolyte portion, that is, a face opposed to the face where the current collector was formed, a current collector is formed in the same manner as described above. By doing this, a pair of current collectors facing each other through the solid electrolyte portion is formed.

Subsequently, a positive electrode and a negative electrode are formed in the same manner as in Step S6 of the first embodiment. By doing this, a lithium battery is produced.

As described above, according to this modification, since the MOD method is adopted, the solid electrolyte portion can be formed without preparing the second mixture as in the above-mentioned embodiment. Therefore, the process for producing a lithium battery can be simplified.

Second Modification

Method for Producing Lithium Battery

In the formation of a solid electrolyte portion containing a lithium composite metal oxide of the compositional formula (1), a solid-phase synthesis method may be used. Specifically, the above-mentioned lithium compound, lanthanum compound, zirconium compound, compound of the element Ma, and compound of the element Mb are used. These compounds are preferably a powder, but the average particle diameter or the particle size distribution of the powder is not particularly limited, and a sizing operation of making the average particle diameter of the particles uniform may be performed. Further, a treatment of removing adsorbed water on the surface of the particle may be performed in a dry atmosphere in advance.

The above-mentioned compounds are weighed at a predetermined ratio according to the composition of the compositional formula (1), followed by mixing, and the resulting material is used as a starting raw material. At this time, lithium in the composition is sometimes volatilized by heating in a post-process. Therefore, the lithium compound may be excessively blended in advance so that the content thereof in the first mixture is more by about 0.05 mol % to 30 mol % with respect to the desired composition according to the heating condition.

First, the above-mentioned starting raw material is subjected to an operation of forming a molded material from a powder is performed. By doing this, particles of the starting raw material are easily brought into close contact with one another, and a solid-phase reaction in the starting raw material is accelerated. The shape of the molded material or the method is not particularly limited, and for example, a known method by press processing using a die as a tablet molder, CIP (Cold Isostatic Pressing), or the like can be adopted. Further, a binder (binding agent) such as a resin may be added to the starting raw material for assisting molding.

The heating treatment of the molded material of the starting raw material is performed in the same manner as the second heating treatment and the third heating treatment of the above-mentioned embodiment. The heating treatment is performed in an atmosphere in which oxygen gas is present such as under the atmosphere or in argon-oxygen mixed gas. According to this, the lithium composite metal oxide of the compositional formula (1) is synthesized, and the solid electrolyte portion is formed. The solid electrolyte portion may be formed by subjecting the powder of the starting raw material to the heating treatment without processing the powder into a molded material, and thereafter performing molding.

The steps after forming the solid electrolyte portion are performed in the same manner as in the first embodiment, whereby the lithium battery is produced.

As described above, according to this modification, since the solid-phase synthesis method is adopted, the solid electrolyte portion can be formed without preparing the first mixture, the second mixture, and the third mixture as in the above-mentioned embodiment. Therefore, the operation such as dissolution or dispersion in an organic solvent or volatilization of the organic solvent are omitted, so that the process for producing a lithium battery can be simplified.

Third Modification

Secondary Battery

A lithium battery as a secondary battery according to this modification will be described. Toa solid electrolyte portion in the lithium battery, a plurality of types of elements Ma and Mb may be added as the lithium composite metal oxide of the compositional formula (1). That is, in the lithium composite metal oxide of the compositional formula (1), a plurality of types among Sb, Bi, Ce, Mn, V, Te, Tc, and Sn may be added as the element Ma, and a plurality of types among Nb, Cr, Mo, W, Ta, and Ti may be added as the element Mb.

Specifically, when a plurality of types of elements are used as each of the elements Ma and Mb, an element having the largest redox potential among the plurality of types of elements used as the element Ma is referred to as Ma1, and an element having the smallest redox potential among the plurality of types of elements used as the element Mb is referred to as Mb1. At this time, it is preferred to select the elements Ma1 and Mb1 so that the difference in redox potential between the element Ma1 and the element Mb1 is about 1.0 V or more. Here, as one element of the elements Ma and Mb, one type may be used, and as the other element, a plurality of types may be used.

Further, when a plurality of types of elements are used as each of the elements Ma and Mb, it is preferred to select the elements Ma and Mb so that the total ion conductivity of the solid electrolyte portion is $5.0 \times 10^{-4}$ S/cm or more. When a plurality of types of elements are used as each of the elements Ma and Mb, the maximum battery capacity of the lithium battery is determined by a combination of the element Ma1 and the element Mb1.

Hereinafter, contents derived from the embodiments will be described.

The secondary battery includes a solid electrolyte portion containing a lithium composite metal oxide represented by the following compositional formula (1), and current collectors disposed opposite to each other through the solid electrolyte portion.

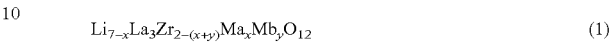

Provided that $0.5<x+y<1.2$ and $(ix+jy)+4(x+y)>8$ wherein i is an oxidation number of Ma and j is an oxidation number of Mb are satisfied, and Ma represents one or more types of Sb, Bi, Ce, Mn, V, Te, Tc, and Sn, and Mb represents one or more types of Nb, Cr, Mo, W, Ta, and Ti.

According to this configuration, the interface resistance of the secondary battery is reduced, and the battery reaction area can be expanded. In more detail, in the lithium composite metal oxide represented by the compositional formula (1), lithium lanthanum zirconate is partially substituted with the elements Ma and Mb. The element Ma and the element Mb have different redox potentials. Therefore, when a potential for polarizing into a positive electrode and a negative electrode, that is, a polarizing voltage is applied to the pair of current collectors, in the solid electrolyte portion, a positive electrode active material containing the element Ma is generated at a face in contact with one of the current collectors and the vicinity thereof. At the same time, in the solid electrolyte portion, a negative electrode active material containing the element Mb is generated at a face in contact with the other current collector and the vicinity thereof. According to this, a positive electrode and a negative electrode are formed in the solid electrolyte portion. In this manner, a composite body such as a battery in the related art is not formed, and therefore, a void is less likely to be generated in the structure. Due to this, as compared with a battery in the related art, a contact area between the positive electrode active material or the negative electrode active material and the solid electrolyte portion is expanded and the interface resistance therebetween is reduced. Accordingly, the secondary battery having a battery reaction area expanded more than in the related art can be provided.

Since $0.5<x+y<1.2$ is satisfied, the lithium ion conduction property is improved so that the charge-discharge rate of the secondary battery can be ensured. Further, since $(ix+jy)+4(x+y)>8$ is satisfied, Ma and Mb deposited at a crystal grain boundary of the lithium composite metal oxide of the compositional formula (1) can be converted into active materials.

In the above-mentioned secondary battery, it is preferred that Ma in the compositional formula (1) is Sb, Mb in the compositional formula (1) is Ta, and $0.5<x+y<1.2$ and $(ix+jy)+4(x+y)>8$ wherein, i is an oxidation number of Sb and j is an oxidation number of Ta are satisfied.

According to this configuration, the difference in redox potential between Sb (antimony) having a redox potential of about 0.7 V and Ta (tantalum) having a redox potential of about −0.81 V is about 1.51 V. Therefore, by applying a polarizing voltage of about 1.51 V or more, a positive electrode active material containing Sb and a negative electrode active material containing Ta are generated and can be utilized as a secondary battery. Further, the active materials of the positive electrode and the negative electrode are formed from portions of the solid electrolyte portion, and therefore, a contact interface between the solid electrolyte portion and the active material is favorably formed. Accordingly, the interface resistance is reduced, and the charge-discharge rate of the secondary battery can be improved.

In the above-mentioned secondary battery, it is preferred that the thickness of the solid electrolyte portion is 0.5 μm or more and 30 μm or less.

According to this configuration, by setting the thickness of the solid electrolyte portion to 0.5 μm or more, in the production process, breakage of the solid electrolyte portion is reduced, and the ease of fabrication can be improved. By setting the thickness of the solid electrolyte portion to 30 μm or less, a thin secondary battery can be formed.

The electronic apparatus includes the above-mentioned secondary battery.

According to this configuration, the battery reaction area is expanded, so that an electronic apparatus including the battery that is small and has high quality as a power supply source can be provided.

The method for producing a secondary battery includes forming a solid electrolyte portion containing a lithium composite metal oxide represented by the following compositional formula (1), forming current collectors so as to sandwich the solid electrolyte portion, and causing a direct current to flow between the current collectors by applying a polarizing voltage therebetween.

$$Li_{7-x}La_3Zr_{2-(x+y)}Ma_xMb_yO_{12} \tag{1}$$

Provided that $0.5<x+y<1.2$ and $(ix+jy)+4(x+y)>8$ wherein i is an oxidation number of Ma and j is an oxidation number of Mb are satisfied, and Ma represents one or more types of Sb, Bi, Ce, Mn, V, Te, Tc, and Sn, and Mb represents one or more types of Nb, Cr, Mo, W, Ta, and Ti.

According to this configuration, a secondary battery having an expanded battery reaction area can be produced. In more detail, in the lithium composite metal oxide represented by the compositional formula (1), lithium lanthanum zirconate is partially substituted with the elements Ma and Mb. The element Ma and the element Mb have different redox potentials. Therefore, when a potential for polarizing into a positive electrode and a negative electrode, that is, a polarizing voltage is applied to the pair of current collectors, in the solid electrolyte portion, a positive electrode active material containing the element Ma is generated at a face in contact with one of the current collectors and the vicinity thereof. At the same time, in the solid electrolyte portion, a negative electrode active material containing the element Mb is generated at a face in contact with the other current collector and the vicinity thereof. According to this, a positive electrode and a negative electrode are formed in the solid electrolyte portion. In this manner, a composite body such as a battery in the related art is not formed, and therefore, a void is less likely to be generated in the structure. Due to this, as compared with a battery in the related art, a contact area between the positive electrode active material or the negative electrode active material and the solid electrolyte portion is expanded and the interface resistance therebetween is reduced. Accordingly, the secondary battery having a battery reaction area expanded more than in the related art can be provided.

Since $0.5<x+y<1.2$ is satisfied, the lithium ion conduction property is improved so that the charge-discharge rate of the secondary battery can be ensured. Further, since $(ix+jy)+4(x+y)>8$ is satisfied, Ma and Mb deposited at a crystal grain boundary of the lithium composite metal oxide of the compositional formula (1) can be converted into active materials.

Since a positive electrode and a negative electrode are formed by applying a polarizing voltage to the solid electrolyte portion to cause a direct current to flow, a step of forming a positive electrode and a negative electrode can be simplified more than in the related art.

In the above-mentioned method for producing a secondary battery, it is preferred that in the forming a solid electrolyte portion, a solid electrolyte portion containing the lithium composite metal oxide in which in the compositional formula (1), Ma is Sb, Mb is Ta, and $0.5<x+y<1.2$ and $(ix+jy)+4(x+y)>8$ wherein i is an oxidation number of Sb, and j is an oxidation number of Ta are satisfied is formed.

According to this configuration, the difference in redox potential between Sb having a redox potential of about 0.7 V and Ta having a redox potential of about −0.81 V is about 1.51 V. Therefore, by applying a polarizing voltage of about 1.51 V or more, a positive electrode active material containing Sb and a negative electrode active material containing Ta are generated and can be utilized as a secondary battery. Further, the active materials of the positive electrode and the negative electrode are formed from portions of the solid electrolyte portion, and therefore, a contact interface between the solid electrolyte portion and the active material is favorably formed. Accordingly, the interface resistance is reduced, and the charge-discharge rate of the secondary battery can be improved.

In the above-mentioned method for producing a secondary battery, it is preferred that the forming a solid electrolyte portion includes preparing a first mixture by dissolving a plurality of types of raw materials containing elements constituting the lithium composite metal oxide represented by the compositional formula (1) in a first solvent, followed by mixing, forming a calcined body of the lithium composite metal oxide by subjecting the first mixture to a first heating treatment to cause a reaction, preparing a second mixture by grinding the calcined body, followed by mixing with a second solvent and a first binder, molding the prepared second mixture, followed by being subjected to a second heating treatment, preparing a third mixture by grinding a fired body that was subjected to the second heating treatment, followed by mixing with a third solvent and a second binder, and molding the third mixture, followed by being subjected to a third heating treatment.

According to this configuration, the third mixture having fluidity is prepared from the ground fired body and the third solvent. Therefore, the shape of the secondary battery can be easily molded from the third mixture. Further, by the third heating treatment, the solid electrolyte portion is fired, and sintering of the lithium composite metal oxide is accelerated. Accordingly, the lithium ion conduction property of the solid electrolyte portion can be improved.

In the above-mentioned method for producing a secondary battery, it is preferred that the forming a solid electrolyte portion includes preparing a first mixture by dissolving a plurality of types of raw materials containing elements constituting the lithium composite metal oxide represented by the compositional formula (1) in a first solvent, followed by mixing, forming a calcined body of the lithium composite metal oxide by subjecting the first mixture to a first heating treatment to cause a reaction, forming a molded body by grinding the calcined body, followed by pressurization, and subjecting the molded body to a second heating treatment and a third heating treatment.

According to this configuration, the shape of the secondary battery is directly formed without dispersing the ground calcined body in a solvent or the like. That is, the operation of mixing the ground calcined body with a solvent and the operation of volatilizing the solvent are omitted, so that the production process can be simplified. Further, the solid electrolyte portion is fired by the second heating treatment and the third heating treatment, and sintering of the lithium composite metal oxide can be accelerated.

In the above-mentioned method for producing a secondary battery, it is preferred that in the causing a direct current to flow, the polarizing voltage is applied at 0.5 V or more and 6.0 V or less.

According to this configuration, production of the positive electrode active material containing the element Ma and the negative electrode active material containing the element Mb is accelerated and a time of applying the polarizing voltage can be reduced.

In the above-mentioned method for producing a secondary battery, it is preferred that in the forming a solid electrolyte portion, the solid electrolyte portion having a thickness of 0.5 μm or more and 30 μm or less is formed.

According to this configuration, by setting the thickness of the solid electrolyte portion to 0.5 μm or more, in the production process, the ease of fabrication of the solid electrolyte portion can be improved. By setting the thickness of the solid electrolyte portion to 30 μm or less, a thin secondary battery can be produced.

In the above-mentioned method for producing a secondary battery, it is preferred that in the forming the solid electrolyte portion, as the first heating treatment, heating is performed at 200° C. or higher and 540° C. or lower, as the second heating treatment, heating is performed at 680° C. or higher and 1000° C. or lower, and as the third heating treatment, heating is performed at 900° C. or higher and 1200° C. or lower.

According to this configuration, by the first heating treatment, an organic substance such as an impurity contained in the first mixture is decomposed and reduced. Therefore, in the second heating treatment and the third heating treatment, the solid electrolyte portion is formed while increasing the purity. In addition to this, by setting the temperature of the first heating treatment, the second heating treatment, and the third heating treatment to 1200° C. or lower, the occurrence of a side reaction at the crystal grain boundary or volatilization of lithium is suppressed. Accordingly, the secondary battery having a further improved lithium ion conduction property can be produced.

What is claimed is:

1. A secondary battery, comprising:
a solid electrolyte portion containing a lithium composite metal oxide represented by the following compositional formula (1); and
current collectors disposed opposite to each other through the solid electrolyte portion:

$$Li_{7-x}La_3Zr_{2-(x+y)}Ma_xMb_yO_{12} \tag{1}$$

provided that 0.5<x+y<1.2 and (ix+jy)+4(x+y)>8 wherein i is an oxidation number of Ma and j is an oxidation number of Mb are satisfied, and Ma represents one or more types of Sb, Bi, Ce, Mn, V, Te, Tc, and Sn, and Mb represents one or more types of Nb, Cr, Mo, W, Ta, and Ti.

2. The secondary battery according to claim 1, wherein Ma in the compositional formula (1) is Sb,
Mb in the compositional formula (1) is Ta, and
0.5<x+y<1.2 and (ix+jy)+4(x+y)>8 wherein i is an oxidation number of Sb and j is an oxidation number of Ta are satisfied.

3. The secondary battery according to claim 1, wherein the solid electrolyte portion has a thickness of 0.5 μm or more and 30 μm or less.

4. An electronic apparatus, comprising the secondary battery according to claim 1.

5. A method for producing a secondary battery, comprising:
forming a solid electrolyte portion containing a lithium composite metal oxide represented by the following compositional formula (1);
forming current collectors so as to sandwich the solid electrolyte portion; and
causing a direct current to flow between the current collectors by applying a polarizing voltage therebetween:

$$Li_{7-x}La_3Zr_{2-(x+y)}Ma_xMb_yO_{12} \tag{1}$$

provided that 0.5<x+y<1.2 and (ix+jy)+4(x+y)>8 wherein i is an oxidation number of Ma and j is an oxidation number of Mb are satisfied, and Ma represents one or more types of Sb, Bi, Ce, Mn, V, Te, Tc, and Sn, and Mb represents one or more types of Nb, Cr, Mo, W, Ta, and Ti.

6. The method for producing a secondary battery according to claim 5, wherein
in the forming of a solid electrolyte portion, a solid electrolyte portion containing the lithium composite metal oxide in which in the compositional formula (1), the Ma is Sb, the Mb is Ta, and 0.5<x+y<1.2 and (ix+jy)+4(x+y)>8 wherein i is an oxidation number of the Sb, and j is an oxidation number of the Ta are satisfied is formed.

7. The method for producing a secondary battery according to claim 5, wherein
the forming of a solid electrolyte portion includes
preparing a first mixture by dissolving a plurality of types of raw materials containing elements constituting the lithium composite metal oxide represented by the compositional formula (1) in a first solvent, followed by mixing,
forming a calcined body of the lithium composite metal oxide by subjecting the first mixture to a first heating treatment to cause a reaction,
preparing a second mixture by grinding the calcined body, followed by mixing with a second solvent and a first binder,
molding the prepared second mixture, followed by being subjected to a second heating treatment,
preparing a third mixture by grinding a fired body that was subjected to the second heating treatment, followed by mixing with a third solvent and a second binder, and
molding the third mixture, followed by being subjected to a third heating treatment.

8. The method for producing a secondary battery according to claim 5, wherein
the forming of a solid electrolyte portion includes
preparing a first mixture by dissolving a plurality of types of raw materials containing elements constituting the lithium composite metal oxide represented by the compositional formula (1) in a first solvent, followed by mixing,
forming a calcined body of the lithium composite metal oxide by subjecting the first mixture to a first heating treatment to cause a reaction,
forming a molded body by grinding the calcined body, followed by pressurization, and
subjecting the molded body to a second heating treatment and a third heating treatment.

9. The method for producing a secondary battery according to claim 5, wherein in the causing of a direct current to flow, the polarizing voltage is applied at 0.5 V or more and 6.0 V or less.

10. The method for producing a secondary battery according to claim 5, wherein in the forming of a solid electrolyte portion, the solid electrolyte portion having a thickness of 0.5 µm or more and 30 µm or less is formed.

11. The method for producing a secondary battery according to claim 7, wherein in the forming of a solid electrolyte portion, as the first heating treatment, heating is performed at 200° C. or higher and 540° C. or lower, as the second heating treatment, heating is performed at 680° C. or higher and 1000° C. or lower, and as the third heating treatment, heating is performed at 900° C. or higher and 1200° C. or lower.

\* \* \* \* \*